(12) United States Patent
Katsumoto et al.

(10) Patent No.: US 11,385,165 B2
(45) Date of Patent: Jul. 12, 2022

(54) SAMPLE ISOLATION KIT, SAMPLE ISOLATION DEVICE

(71) Applicant: Sony Corporation, Tokyo (JP)

(72) Inventors: Yoichi Katsumoto, Tokyo (JP);
Masahiro Matsumoto, Kanagawa (JP);
Kazuya Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 776 days.

(21) Appl. No.: 16/087,176

(22) PCT Filed: Mar. 10, 2017

(86) PCT No.: PCT/JP2017/009635
§ 371 (c)(1),
(2) Date: Sep. 21, 2018

(87) PCT Pub. No.: WO2017/169647
PCT Pub. Date: Oct. 5, 2017

(65) Prior Publication Data
US 2019/0064049 A1 Feb. 28, 2019

(30) Foreign Application Priority Data

Mar. 30, 2016 (JP) .............................. JP2016-068247

(51) Int. Cl.
*G01N 15/14* (2006.01)
*B01L 3/00* (2006.01)
*G01N 15/10* (2006.01)

(52) U.S. Cl.
CPC .... *G01N 15/1484* (2013.01); *B01L 3/502761* (2013.01); *B01L 3/502776* (2013.01);
(Continued)

(58) Field of Classification Search
None
See application file for complete search history.

(56) References Cited

U.S. PATENT DOCUMENTS

| 6,599,436 B1 | 7/2003 | Matzke et al. |
| 8,127,624 B2 | 3/2012 | Hashimoto et al. |

(Continued)

FOREIGN PATENT DOCUMENTS

| CN | 101052882 A | 10/2007 |
| CN | 101581728 A | 11/2009 |

(Continued)

OTHER PUBLICATIONS

Chinese Office Action dated Sep. 1, 2020 in connection with Chinese Application No. 201780018698.1, and English translation thereof.

(Continued)

*Primary Examiner* — Lore R Jarrett
(74) *Attorney, Agent, or Firm* — Wolf, Greenfield & Sacks, P.C.

(57) ABSTRACT

According to some aspects, a sample isolation kit is provided. The sample isolation kit includes a housing configured to detachably couple to a sample fluid channel of a microchip and provide a sample to the microchip. The housing and the microchip are coupled using a hermetic seal. The sample isolation kit further includes a storage housing configured to detachably couple to an isolation channel of the microchip and receive a target biological sample isolated from the sample by the microchip. The storage housing and the microchip are coupled using a hermetic seal.

21 Claims, 15 Drawing Sheets

(52) U.S. Cl.
CPC .. *G01N 15/1459* (2013.01); *B01L 2200/0652* (2013.01); *B01L 2300/0816* (2013.01); *B01L 2400/0487* (2013.01); *G01N 2015/1006* (2013.01); *G01N 2015/149* (2013.01)

(56) References Cited

U.S. PATENT DOCUMENTS

| | | | |
|---|---|---|---|
| 8,487,273 | B2 | 7/2013 | Ito et al. |
| 2003/0032892 | A1* | 2/2003 | Erlach .................. A61B 5/4839 600/547 |
| 2004/0060372 | A1* | 4/2004 | Hopkins ............... G01L 1/2243 73/862.637 |
| 2007/0235673 | A1 | 10/2007 | Danna |
| 2008/0039875 | A1 | 2/2008 | Catanese, III et al. |
| 2009/0057569 | A1* | 3/2009 | Shinoda ............. G01N 15/1459 250/492.1 |
| 2011/0020855 | A1* | 1/2011 | Shinoda ............. G01N 15/1484 435/29 |
| 2011/0048952 | A1 | 3/2011 | Van Pelt et al. |
| 2011/0269221 | A1 | 11/2011 | Katsumoto et al. |
| 2011/0271746 | A1 | 11/2011 | Shinoda et al. |
| 2011/0304040 | A1* | 12/2011 | Kojima ................... B01L 3/502 257/729 |
| 2012/0209243 | A1 | 8/2012 | Yan |
| 2013/0209326 | A1 | 8/2013 | Williams et al. |
| 2014/0346047 | A1* | 11/2014 | Shinoda ............. G01N 15/1404 204/603 |
| 2015/0314585 | A1 | 11/2015 | Karam et al. |
| 2016/0008814 | A1 | 1/2016 | Handique et al. |

FOREIGN PATENT DOCUMENTS

| | | |
|---|---|---|
| CN | 102621342 A | 8/2012 |
| CN | 102753955 A | 10/2012 |
| CN | 102803959 A | 11/2012 |
| CN | 103586221 A | 2/2014 |
| CN | 104246512 A | 12/2014 |
| CN | 104549584 A | 4/2015 |
| CN | 104830664 A | 8/2015 |
| CN | 104994901 A | 10/2015 |
| CN | 103769252 B | 1/2016 |
| EP | 1 221 340 A1 | 7/2002 |
| EP | 2876427 A1 | 5/2015 |
| GB | 1 275 154 A | 5/1972 |
| JP | 2007-218874 A | 8/2007 |
| JP | 2009-162643 A | 7/2009 |
| JP | 2010-038866 A | 2/2010 |
| JP | 2010-151777 A | 7/2010 |
| JP | 2011-237201 A | 11/2011 |
| JP | 2012-511155 A | 5/2012 |
| JP | 2015-513346 A | 5/2015 |
| KR | 20110119257 A | 11/2011 |
| WO | WO 03/016555 A1 | 2/2003 |
| WO | WO 2008/039875 A1 | 4/2008 |
| WO | WO-2010106434 A1 | 9/2010 |
| WO | WO-2012012779 A2 | 1/2012 |
| WO | WO 2013/184398 A1 | 12/2013 |
| WO | WO 2014/013802 A1 | 1/2014 |
| WO | WO 2014/069551 A1 | 5/2014 |

OTHER PUBLICATIONS

International Preliminary Report on Patentability dated Oct. 11, 2018 in connection with International Application No. PCT/JP2017/009635.

Terakura et al., Generation of CD19-chimeric antigen receptor modified CD8+ T cells derived from virus-specific central memory T cells. Blood Journal, Jan. 5, 2012, vol. 119(1); pp. 72-82.

International Search Report and Written Opinion dated Jul. 24. 2017 in connection with International Application No. PCT/JP2017/009635.

Kaiser et al., Towards a commercial process for the manufacture of genetically modified T cells for therapy, Cancer Gene Therapy, 2015, vol. 22, pp. 72-78, published online Jan. 23, 2015.

European Office Action dated Dec. 11, 2019 in connection with European Application No. 17714918.4.

Japanese Office Action dated Jun. 2, 2020 in connection with Japanese Application No. 2016-068247, and English translation thereof.

Chinese Office Action dated Apr. 8, 2021, in connection with Chinese Application No. 201780018698.1, and English translation thereof.

Hu Wei, Patent Map Methods and Applications (Chinese Edition). Jan. 2011;445.

* cited by examiner

[Fig. 1]
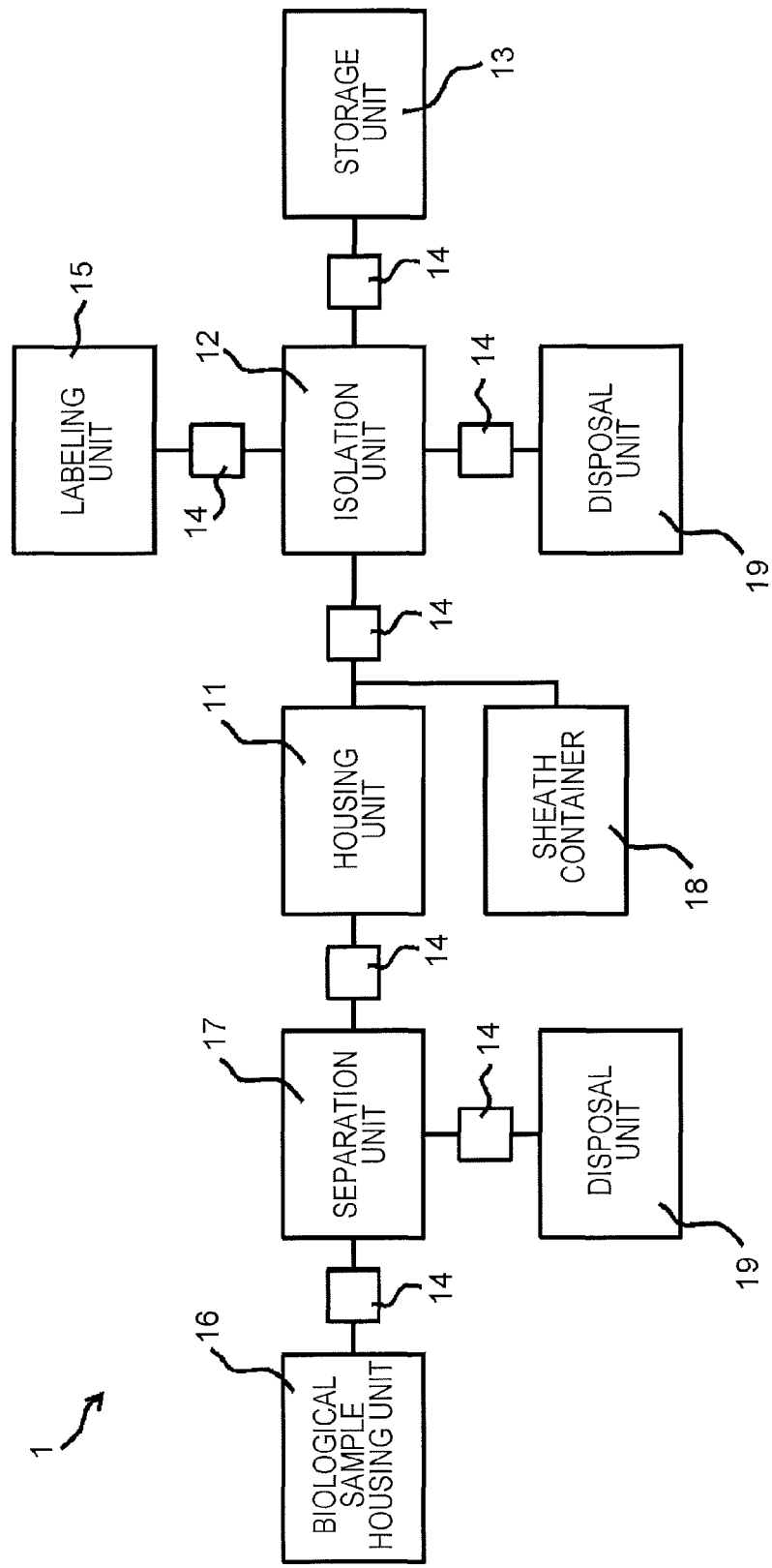

[Fig. 2]
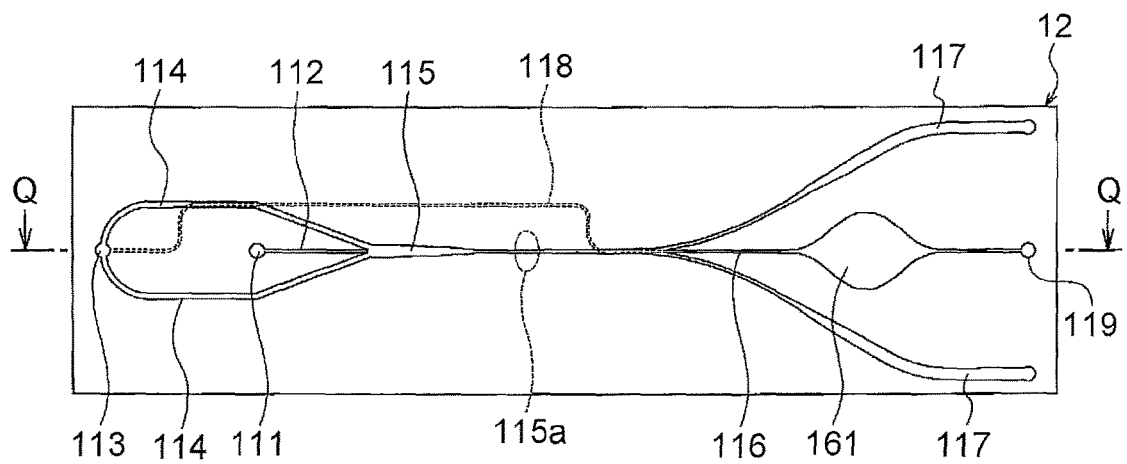
[Fig. 3]
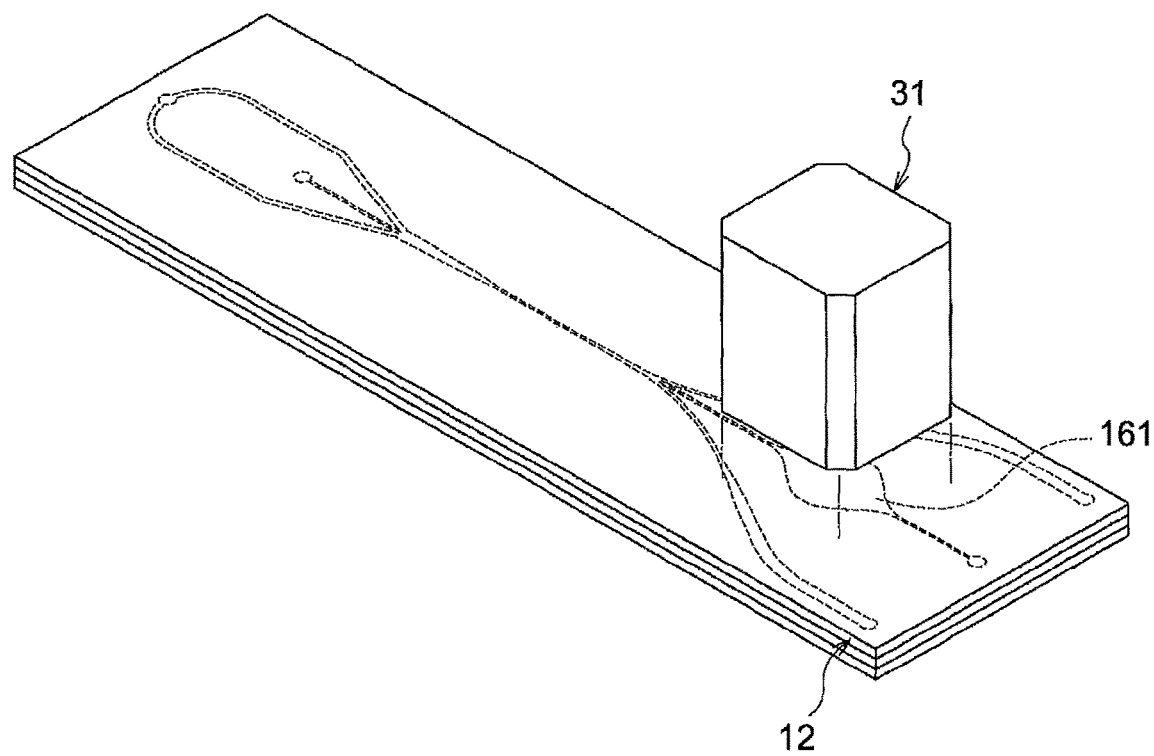

[Fig. 4]
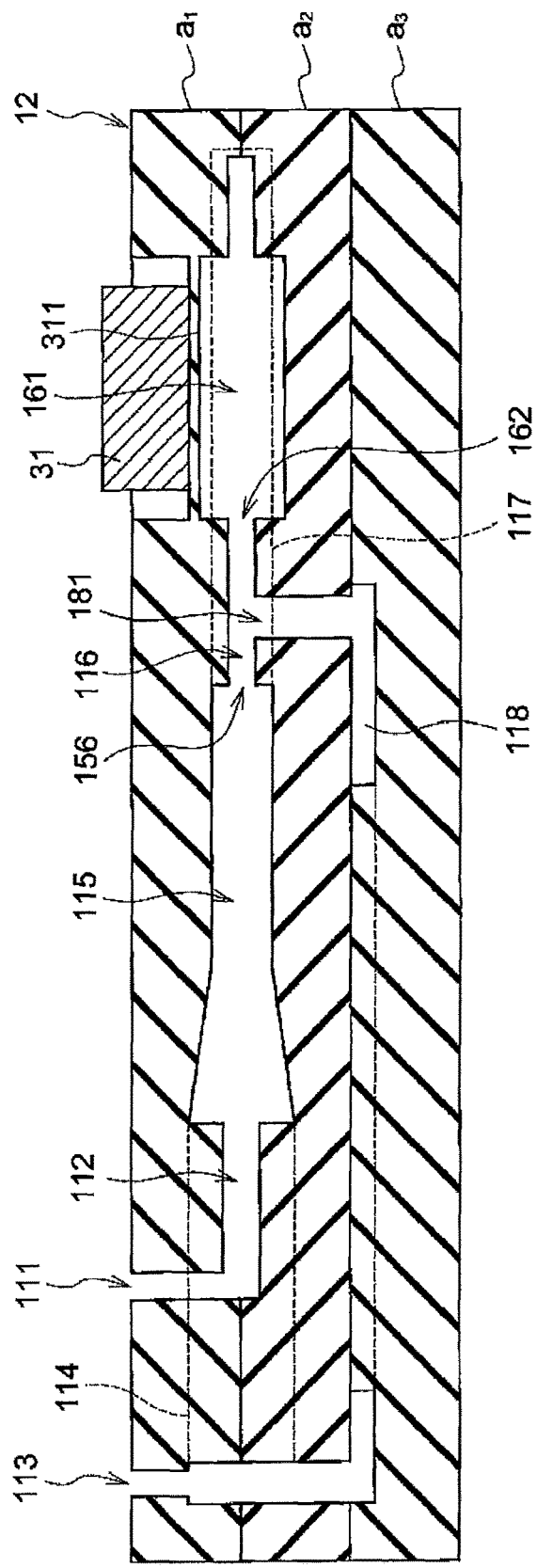

[Fig. 5]
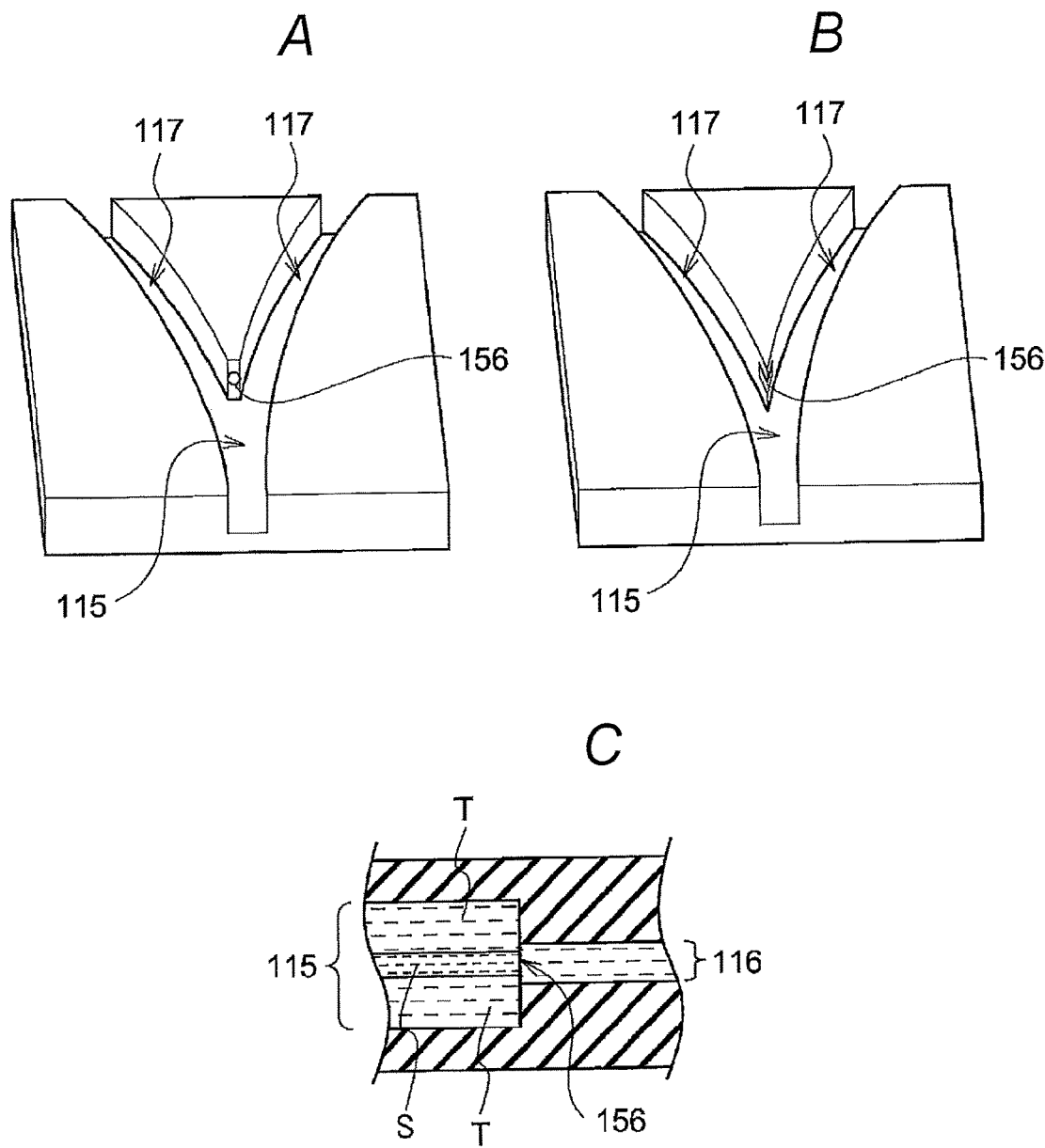

[Fig. 6]
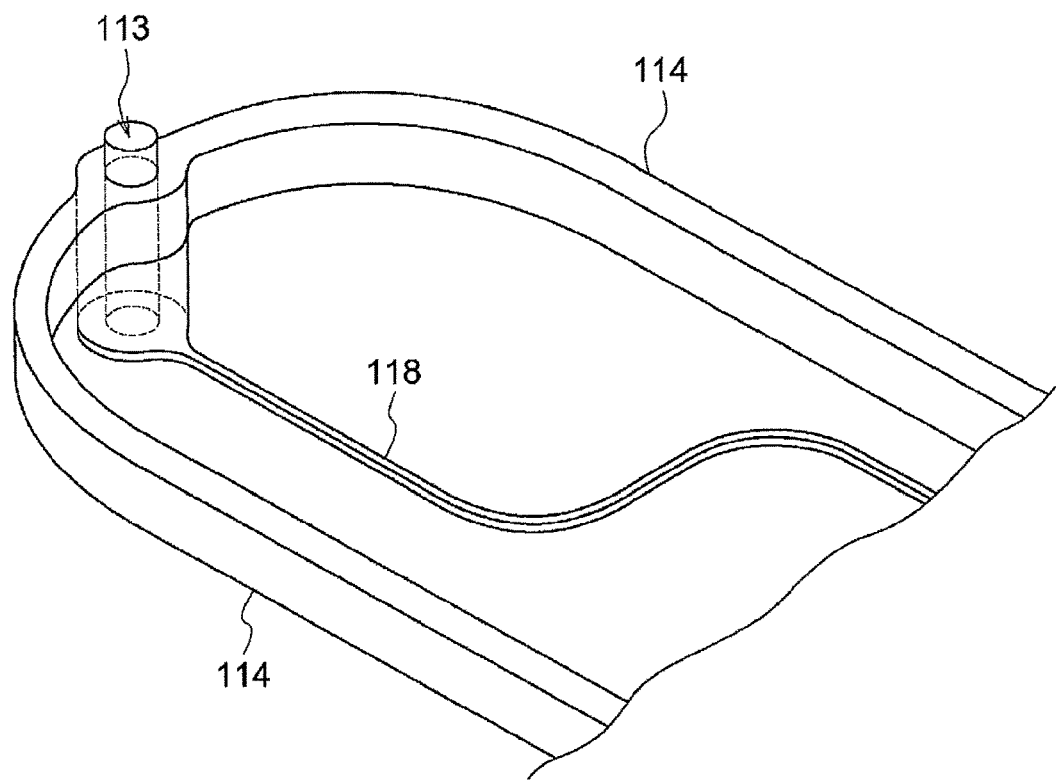
[Fig. 7]
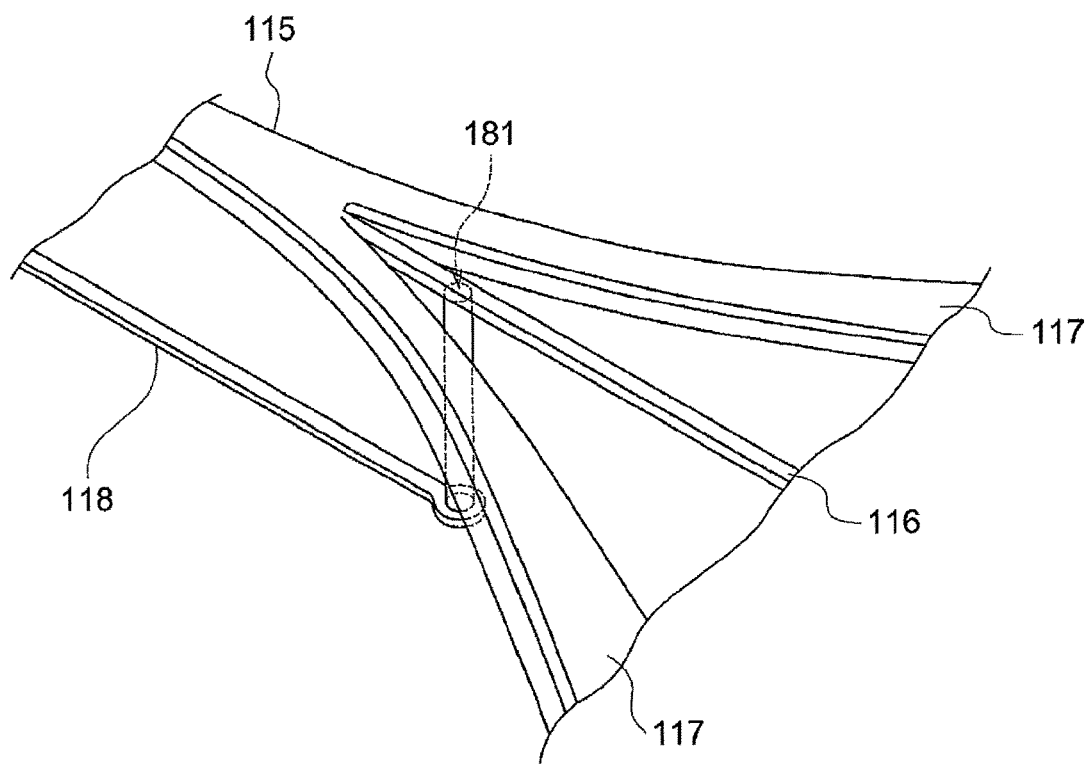

[Fig. 8]
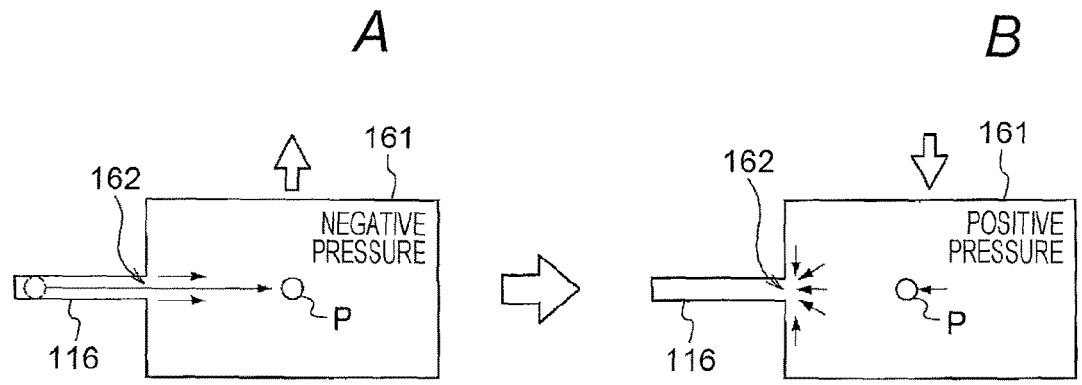
[Fig. 9]
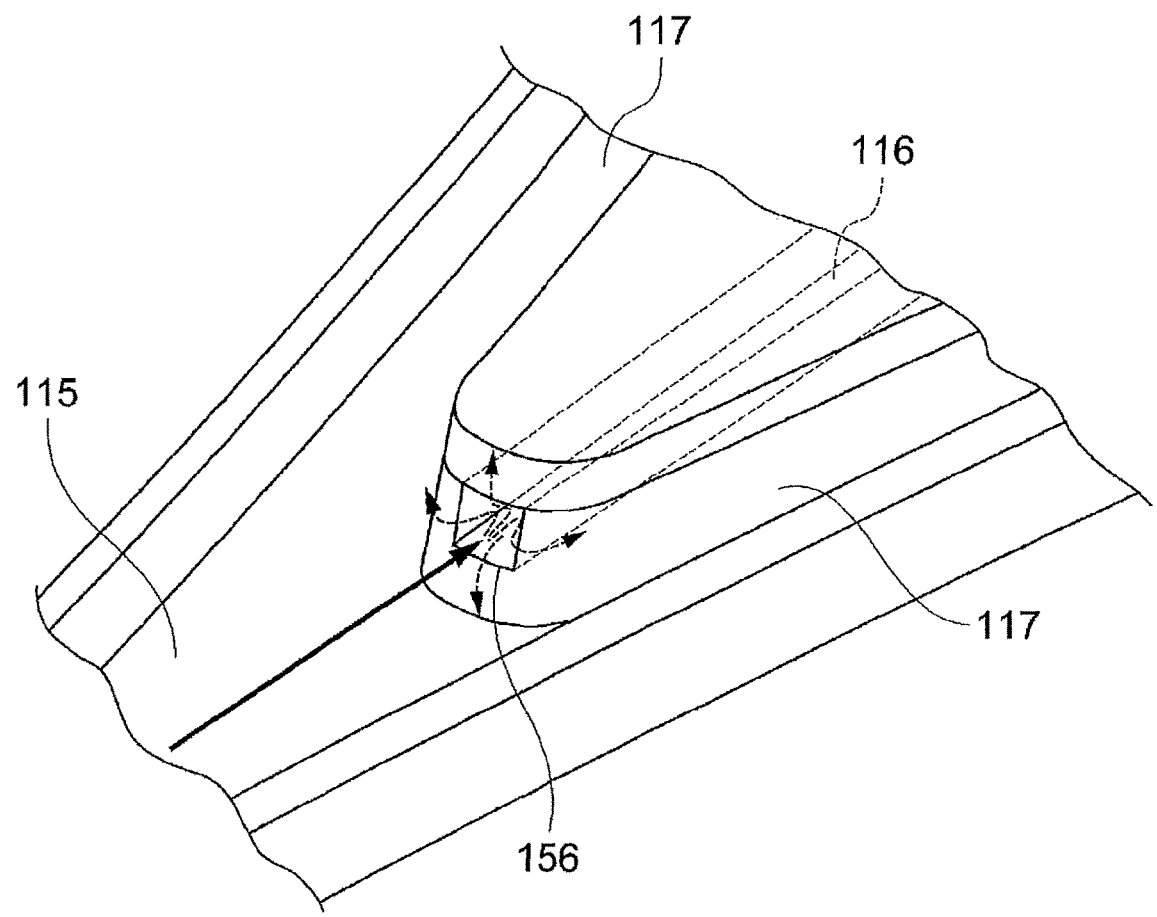

[Fig. 10]
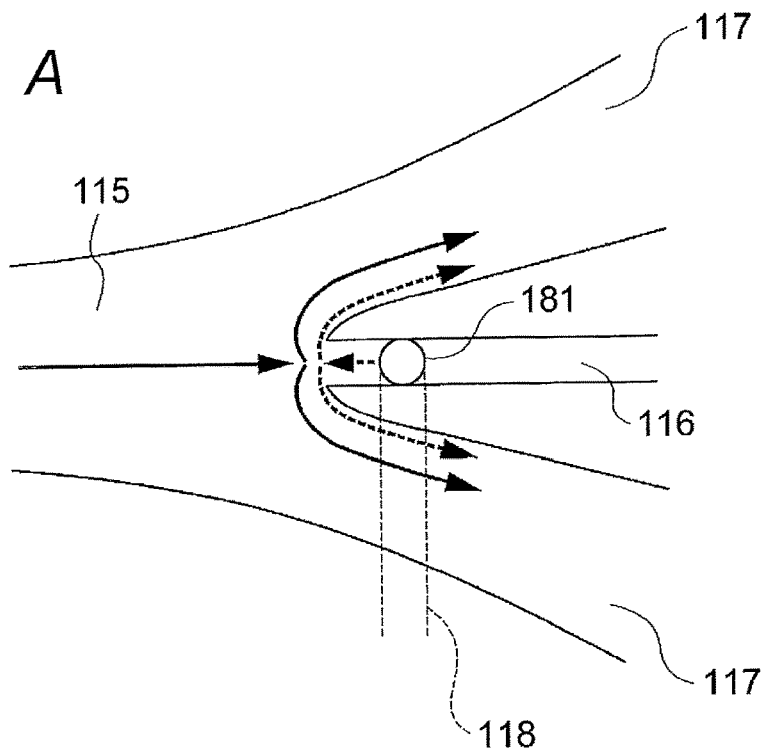
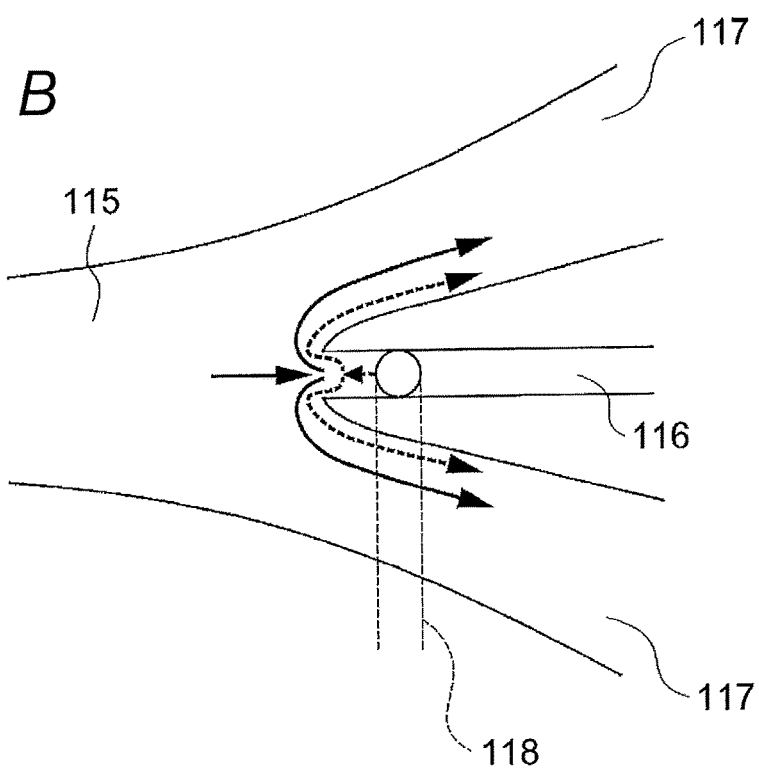

[Fig. 11]
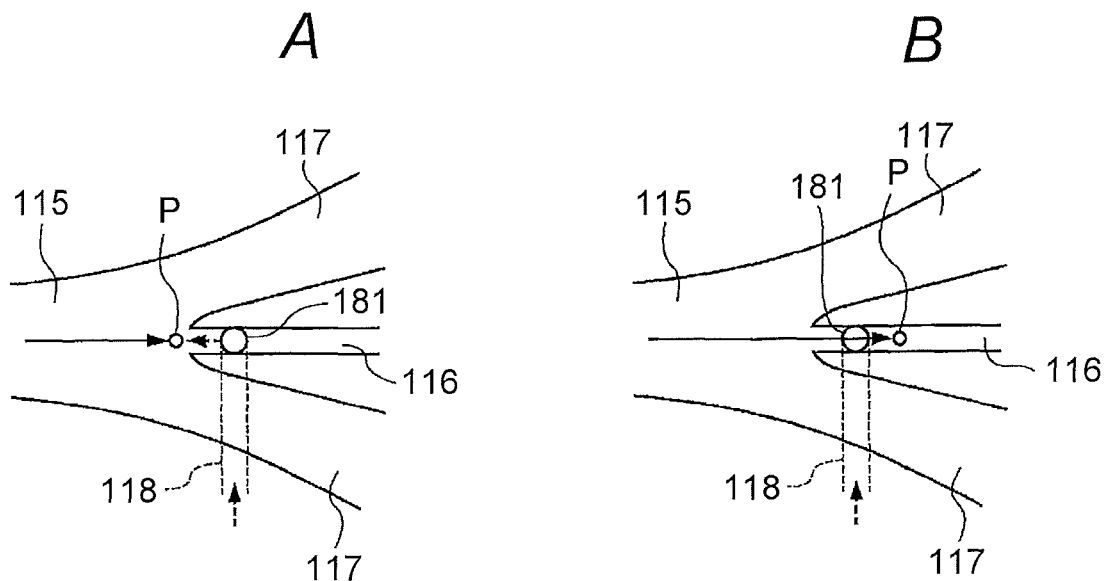
[Fig. 12]
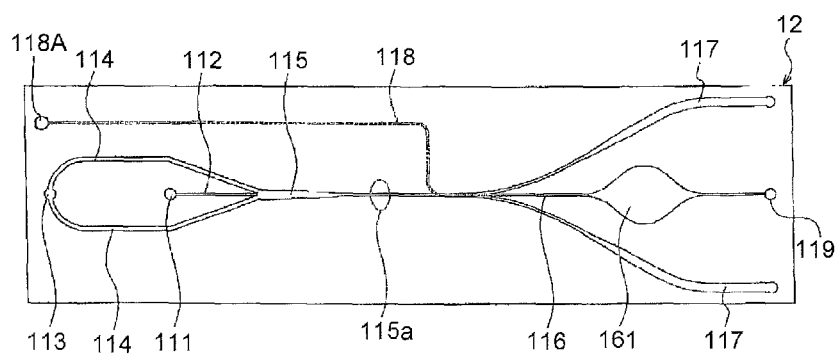

[Fig. 13]
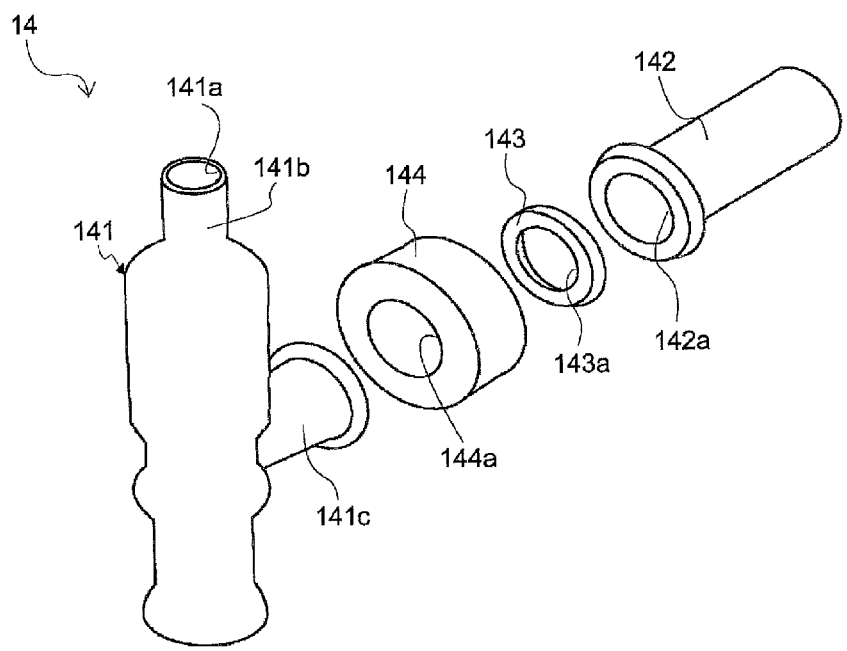

[Fig. 14]
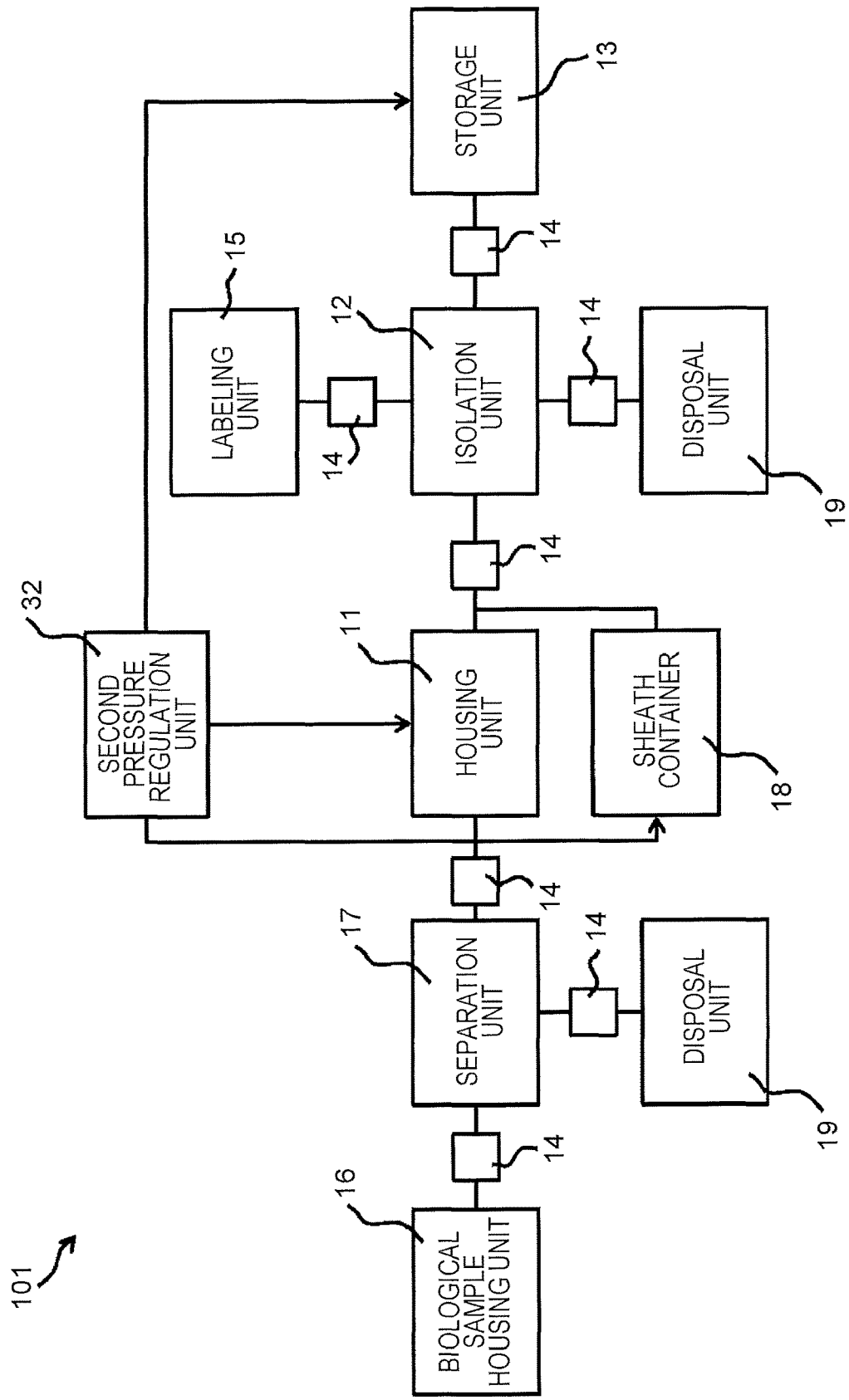

[Fig. 15]
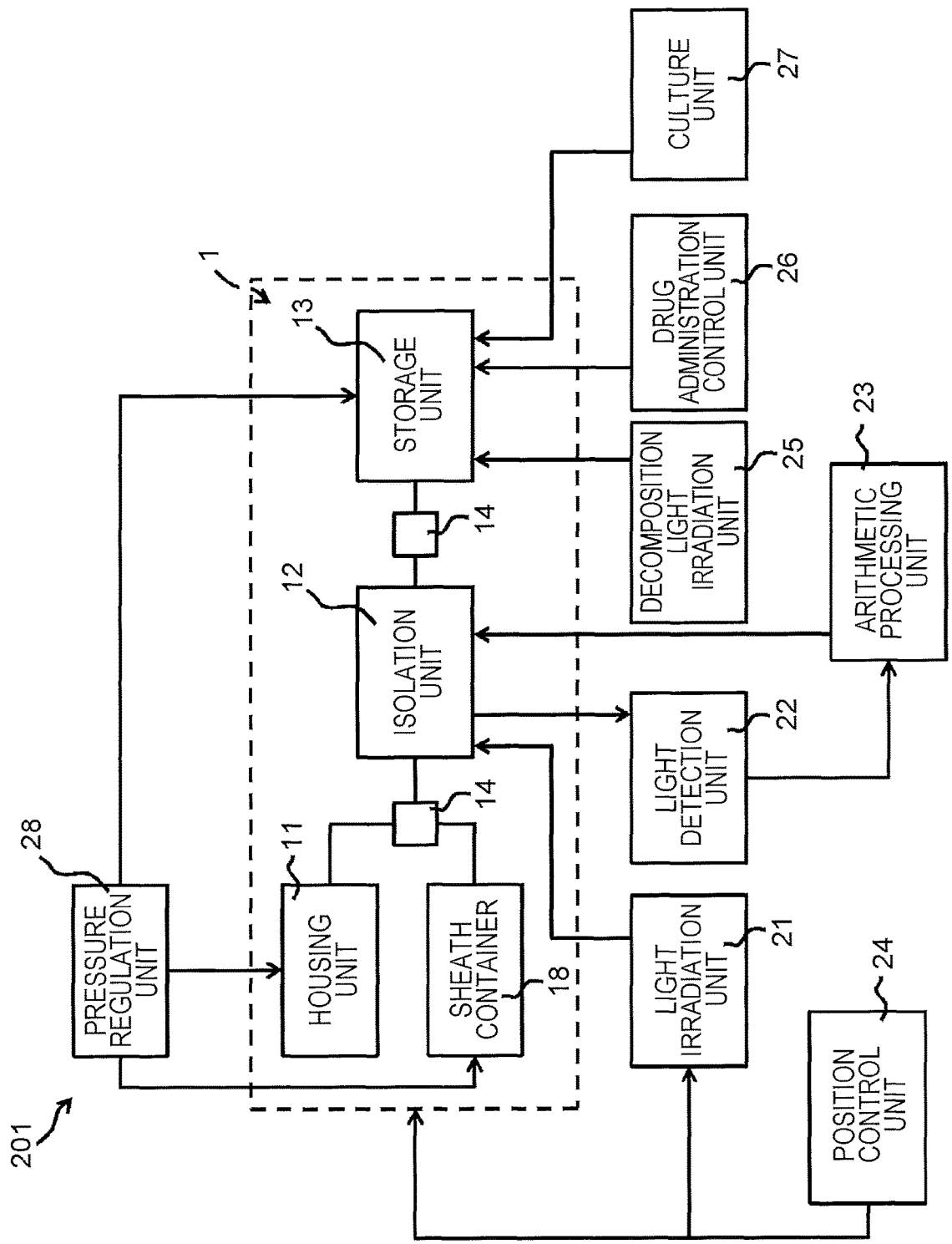

[Fig. 16]
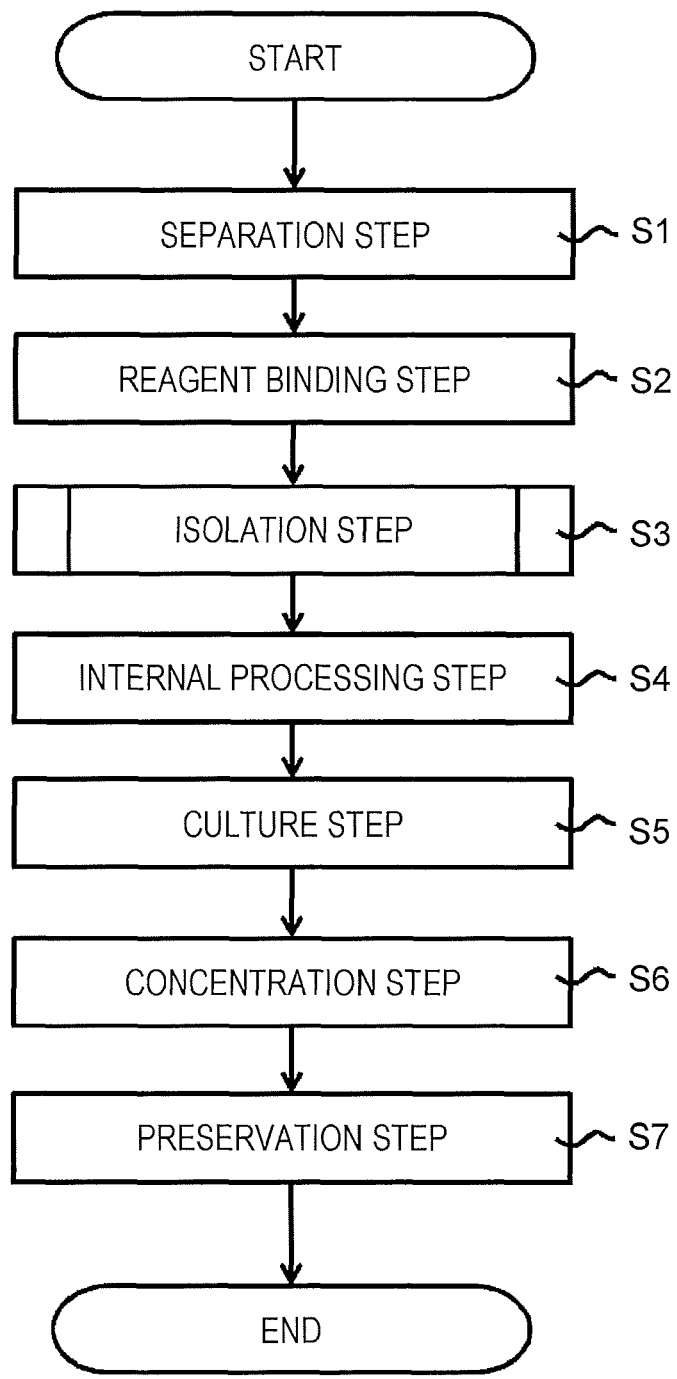

[Fig. 17]
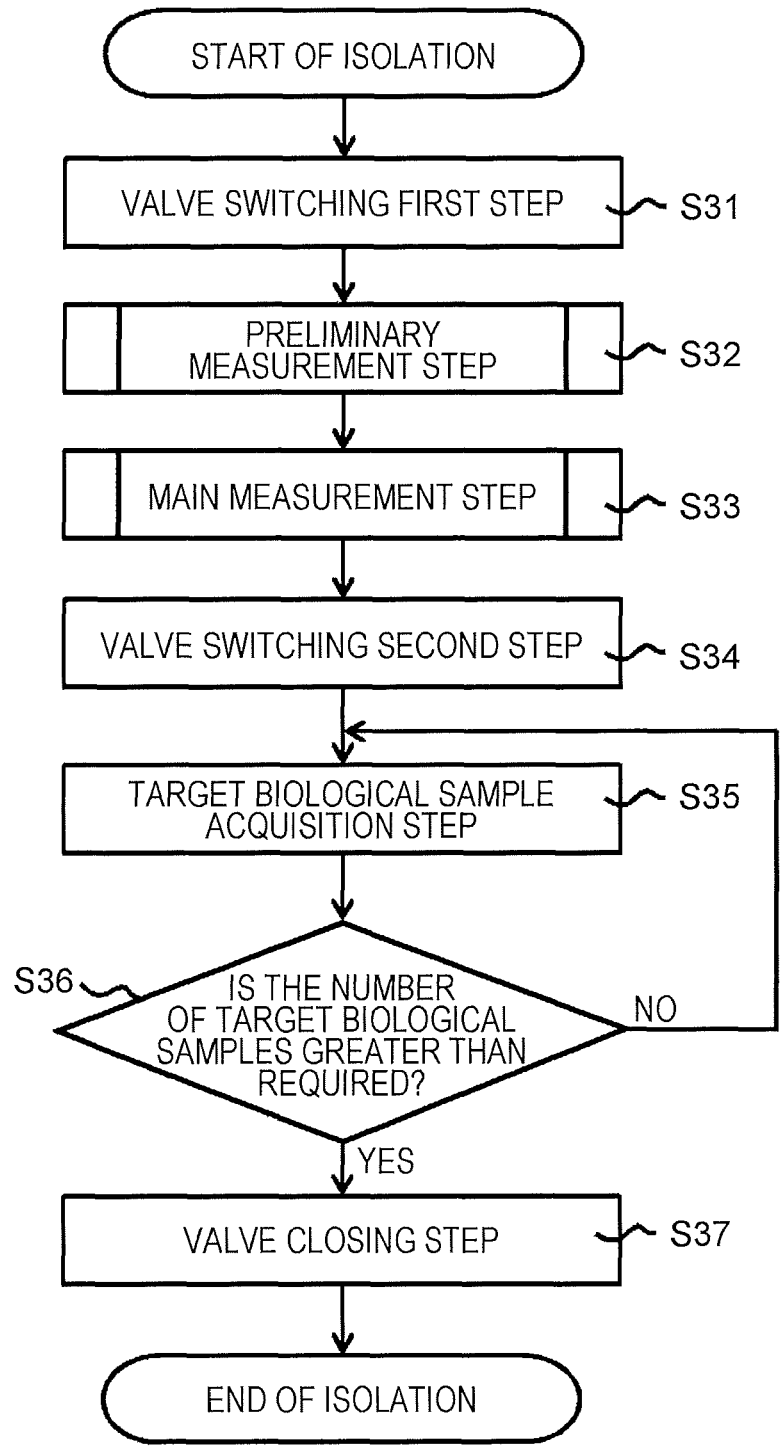

[Fig. 18]
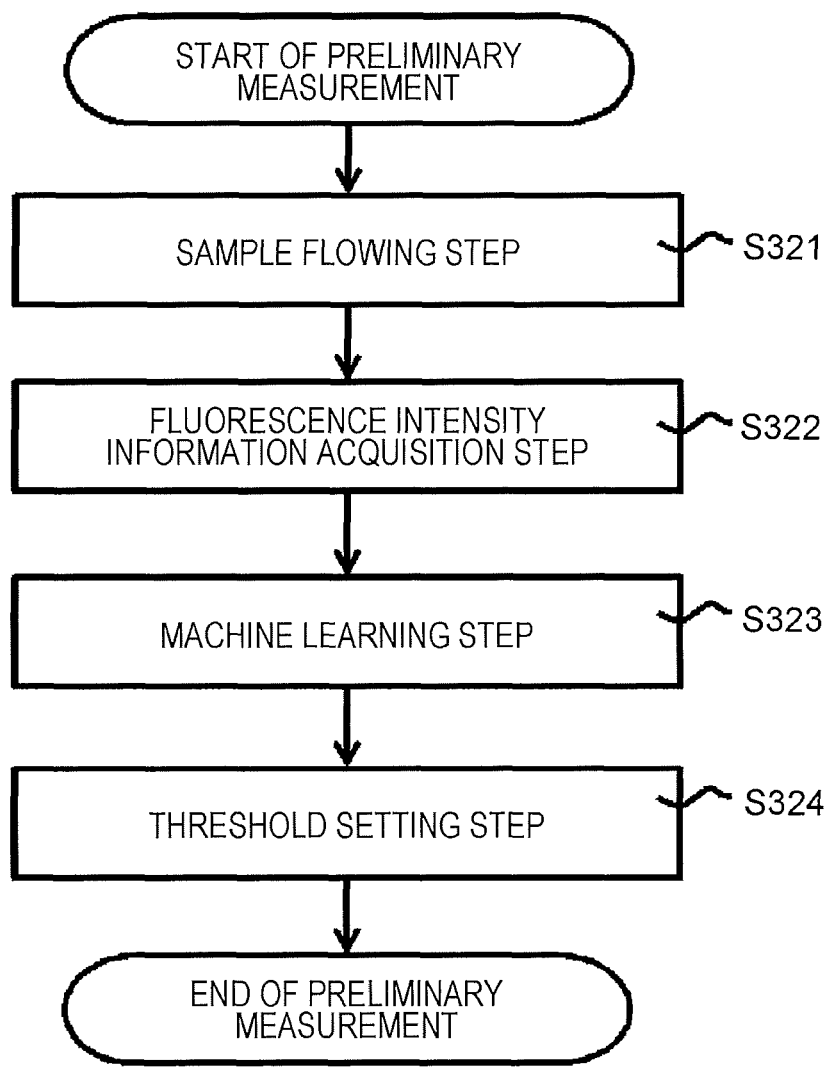

[Fig. 19]
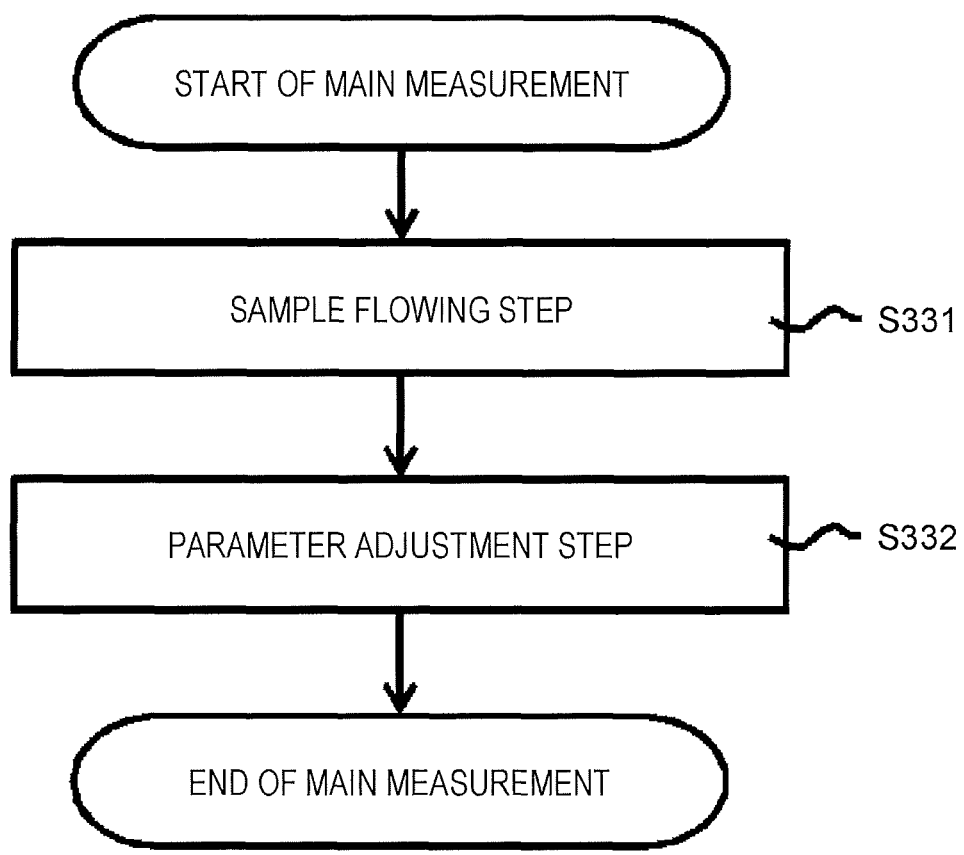

SAMPLE ISOLATION KIT, SAMPLE ISOLATION DEVICE

CROSS REFERENCE TO RELATED APPLICATIONS

This application is a national stage entry filed under 35 U.S.C. § 371 of PCT Application Serial No. PCT/JP2017/009635, filed on Mar. 10, 2017. PCT Application Serial No. PCT/JP2017/009635 claims priority to Japanese Priority Patent Application JP 2016-068247, filed on Mar. 30, 2016, which is herein incorporated by reference in its entirety.

TECHNICAL FIELD

The present technology relates to a sample isolation kit and a sample isolation device. More specifically, it relates to a sample isolation kit that allows the procedures of isolating and storing a target biological sample to be implemented consistently in an enclosed space, and also to a sample isolation device using the sample isolation kit.

BACKGROUND ART

In the past, as methods for isolating a target biological sample from a specific biological sample, although the selection is suitably made according to the kind of the target biological sample, various methods are known, including a membrane separation method, a centrifugal separation method, an electrical separation method, a method in which biological samples other than the target biological sample are killed, a magnetic bead method in which the target biological sample is labeled with a magnetic bead and separated, flow cytometry, and the like.

As a method for isolating a target biological sample using the magnetic bead method, the method disclosed in NPL 1 is known.

According to this method, T cells, which are target biological samples, are labeled with magnetic beads, and the target biological samples are isolated on the basis of the magnetic beads.

In addition, as an isolation device utilizing the flow cytometry, the device shown in PTL 1 is known. PTL 1 discloses a microchip-type isolation device, which forms a sheath flow in a channel formed in a microchip made of plastic and glass, etc., to perform analysis.

In the isolation device disclosed in PTL 1, a sample channel, through which a fluid containing microparticles passes, and an orifice, which discharges the fluid from the sample channel into the space outside the chip, are formed by attaching substrate layers together. The isolation device includes: a microchip formed of the lumen of a microtubule formed of the sample channel of the orifice unit embedded between the substrate layers; a vibration element for making the fluid into droplets and discharging the same in the orifice; a charging section that applies an electrical charge to the droplets discharged; an optical detection section that irradiates microparticles passing through the sample channel with light on the upstream side of the orifice in the fluid delivery direction and detects light emitted from the microparticles; a pair of electrodes arranged along the moving direction of droplets discharged into the space outside the chip and facing each other via the moving droplets; and at least two recovery sections that recover droplets that have passed between the pair of electrodes. In the sample channel between a light irradiation unit to be irradiated with light from the optical detection section and the orifice unit, a conversion channel whose cross-sectional shape changes from a square shape to a circular shape in the direction of fluid delivery is formed.

CITATION LIST

Patent Literature

PTL 1: JP 2011-237201 A

Non Patent Literature

NPL 1: Seitaro Terakura et al., "Generation of CD19-chimeric antigen receptor modified CD8_T cells derived from virus-specific central memory T cells", BLOOD. 5, Jan. 2012, VOLUME 119, NUMBER 1

SUMMARY

Technical Problem

However, in the past isolation methods, such as a membrane separation method, a centrifugal separation method, an electrical separation method, a method in which biological samples other than the target biological sample are killed, and a magnetic bead method in which the target biological sample is labeled with a magnetic bead and separated, there has been a problem in that the degree of purification of the isolation of target biological samples is low. For example, in the case of the centrifugal separation method, when a target biological sample is isolated from a cell suspension, there is a possibility that samples other than the target biological sample may be incorporated. In addition, for example, in the magnetic bead method, there has been a problem in that upon mixing of an isolation object sample with magnetic beads, when the magnetic beads are not sufficiently joined to the target biological sample, a certain amount of target biological sample is not isolated.

Further, in so-called flow cytometer as described in PTL 1, the droplets fly in the space, leading to a problem in that the flow cytometer and the surrounding environment are contaminated with a mist containing the isolation object biological sample. In addition, because the isolation mechanism is in contact with the external atmosphere, there also has been a problem in that other substances in the external atmosphere are incorporated into the biological sample after isolation. Therefore, there has been a problem in that it is difficult to use a flow cytometer for immune cell therapy and the like.

Thus, there is a need for providing a sample isolation kit that allows a target biological sample to be isolated and stored in an enclosed space, and also a sample isolation device.

Solution to Problem

According to an aspect of the present application, a sample isolation kit is provided. The sample isolation kit includes a housing configured to detachably couple to a sample fluid channel of a microchip and provide a sample to the microchip. The housing and the microchip are coupled using a hermetic seal. The sample isolation kit further includes a storage housing configured to detachably couple to an isolation channel of the microchip and receive a target biological sample isolated from the sample by the microchip. The storage housing and the microchip are coupled using a hermetic seal.

According to an aspect of the present application, a sample isolation system is provided. The sample isolation system includes a microchip having a sample fluid channel and an isolation channel. The microchip is configured to isolate a target biological sample from a sample. The sample isolation system further includes a housing configured to detachably couple to the sample fluid channel and provide the sample to the microchip. The housing and the microchip are coupled using a hermetic seal. The sample isolation system further includes a storage housing configured to detachably couple to the isolation channel and receive the target biological sample isolated from the sample by the microchip. The storage housing and the microchip are coupled using a hermetic seal.

Advantageous Effects of Invention

According to an embodiment of the present technology, the isolation of a target biological sample and the storage of the target biological sample can be implemented in an enclosed space, whereby the degree of purification of the isolation of target biological samples can be improved. In addition, the contamination of a sample isolation device, etc., with a mist containing a target biological sample and/or the incorporation of other substances into the isolated target biological sample can be prevented.

Incidentally, the effects described herein are not necessarily limited, and may be any of the effects described in the present technology.

BRIEF DESCRIPTION OF DRAWINGS

FIG. 1 is a schematic conceptual diagram schematically showing the concept of a first embodiment of the sample isolation kit according to an embodiment of the present technology.

FIG. 2 is a top view showing an example of an isolation unit provided in the sample isolation device shown in FIG. 1.

FIG. 3 is a perspective view showing an example of an isolation unit provided in the sample isolation device shown in FIG. 1.

FIG. 4 is a cross-sectional view along the line Q-Q in FIG. 2.

FIGS. 5A to 5C are diagrams illustrating the configuration of the branch part between a main channel and an isolation channel formed in the isolation unit.

FIG. 6 is a diagram illustrating the configuration of the sheath fluid inlet-side end of a sheath fluid bypass channel formed in the isolation unit.

FIG. 7 is a diagram illustrating the configuration of the discharge port-side end of a sheath fluid bypass channel formed in the isolation unit.

FIGS. 8A and 8B are a diagram illustrating the function of a first pressure regulation unit of the isolation unit shown in FIG. 2.

FIG. 9 is a diagram illustrating the flow of an isolation object sample and a sheath fluid that may occur at the branch part between a main channel and branch channels.

FIGS. 10A and 10B are diagrams illustrating the flow of a sheath fluid introduced from a discharge port of the isolation channel.

FIGS. 11A and 11B are diagrams illustrating the position of sucking a target biological sample during the isolation operation.

FIG. 12 is a top view showing a variation of the isolation unit shown in FIG. 2.

FIG. 13 is a schematic conceptual diagram showing an example of a hermetically sealing unit provided in the sample isolation kit shown in FIG. 1.

FIG. 14 is a schematic conceptual diagram schematically showing the concept of a second embodiment of the sample isolation kit according to an embodiment of the present technology.

FIG. 15 is a schematic conceptual diagram schematically showing the concept of a first embodiment of the sample isolation device according to an embodiment of the present technology.

FIG. 16 is a flow chart showing the operation of the sample isolation device shown in FIG. 15.

FIG. 17 is a flow chart showing the details of the isolation step shown in FIG. 16.

FIG. 18 is a flow chart showing the details of the preliminary measurement step shown in FIG. 17.

FIG. 19 is a flow chart showing the details of the main measurement step shown in FIG. 17.

DESCRIPTION OF EMBODIMENTS

Hereinafter, best modes for carrying out the present technology will be described with reference to the drawings.

The embodiments described below show examples of typical embodiments of the present technology, and do not narrow the interpretation of the scope of the present technology.

Incidentally, the description will be given in the following order.

1. Sample Isolation Kit According to First Embodiment
  (1) Housing unit
  (2) Isolation unit
  (3) Storage unit
  (4) Hermetically sealing unit
  (5) Labeling unit
  (6) Biological sample housing unit
  (7) Separation unit
  (8) Sheath container
  (9) Disposal unit
2. Sample Isolation Kit According to Second Embodiment
  (1) Second pressure regulation unit
3. Sample Isolation Device According to First Embodiment
  (1) Sample isolation kit
  (2) Light irradiation unit
  (3) Light detection unit
  (4) Arithmetic processing unit
  (5) Position control unit
  (6) Degradation light irradiation unit
  (7) Drug loading control unit
  (8) Culture unit
  (9) Pressure regulation unit
  (10) Other configuration
4. Description of Operation of Sample Isolation Device According to First Embodiment
  (1) Separation step
  (2) Reagent binding step
  (3) Isolation step
  (3-1) Valve switching first step
  (3-2) Preliminary measurement step
  Sample flowing step
  Fluorescence intensity information acquisition step
  Machine learning step
  Threshold setting step (3-3) Main measurement step
Sample flowing step
Parameter adjustment step
(3-4) Valve switching second step
(3-5) Target biological sample acquisition step
(3-6) Valve closing step
(4) Internal processing step
(5) Culture step
(6) Concentration step
(7) Preservation step

1. Sample Isolation Kit According to First Embodiment

A first embodiment of the sample isolation kit according to an embodiment of the present technology will be described using FIG. 1.

The sample isolation kit 1 according to an embodiment of the present technology at least includes a housing unit 11, an isolation unit 12, and a storage unit 13. The housing unit 11, the isolation unit 12, and the storage unit 13 are connected to each other through a hermetically sealing unit 14. In addition, as necessary, the sample isolation kit 1 may also include a labeling unit 15, a biological sample housing unit 16, a separation unit 17, a sheath container 18, and a disposal unit 19. Each unit will be described hereinafter.

(1) Housing Unit

The sample isolation kit 1 according to an embodiment of the present technology includes a housing unit 11. In the housing unit 11, an isolation object sample, which is the object of the isolation unit 12, is housed. The housing unit 11 is composed of, for example, a cylindrical tubular body, which has an opening at one end, and a lid portion, which fits into the tubular body and blocks the opening. Then, the lid portion has formed therein a plurality of opening valves for housing the isolation object sample in the tubular body, and each opening valve employs the configuration of a check valve. Therefore, in the state where an isolation object sample is housed in the housing unit 11 through the opening valves, the isolation object sample does not come out from the housing unit 11. In addition, because of the configuration of the opening valves, the isolation biological sample is hermetically sealed from the external atmosphere.

The isolation object sample is not particularly limited, any biological sample is acceptable as long as it contains a target biological sample to be isolated using the sample isolation kit according to an embodiment of the present technology. Specific examples of isolation object samples include whole blood, peripheral blood mononuclear cells contained in whole blood, a cell suspension containing only lymphocytes, and like cells from the patient.

(2) Isolation Unit

The sample isolation kit according to an embodiment of the present technology includes an isolation unit 12 that isolates a target biological sample necessary for analysis from the isolation object sample. As in the case of past flow cytometers, the isolation unit 12 is configured such that a sheath flow is formed inside to perform isolation.

The specific configuration of the isolation unit 12 is not particularly limited. For example, the configuration of a microchip, in which the sheath flow is formed and a channel for the isolation object sample to flow is provided, etc., is possible.

The configuration and the isolation operation of a microchip-type isolation unit 12 will be described using FIG. 2 to FIGS. 11A and 11B. Examples of suitable isolation units include a bubble-generating chip and a dielectric cytometry sorting chip.

The configuration of the isolation unit 12 will be described in detail with reference to FIGS. 2 to 4.

The isolation unit 12 roughly includes: a channel which is connected to the housing unit 11 through the hermetically sealing unit 14 and in which the isolation object sample flows; and a first pressure regulation unit that regulates the pressure in the channel to isolate the target biological sample.

That is, an isolation object sample is introduced from an isolation object sample inlet 111 into an isolation object sample channel 112. In addition, a sheath fluid is introduced from a sheath fluid inlet 113. The sheath fluid introduced from the sheath fluid inlet 113 is divided and delivered to two sheath fluid channels 114, 114. The isolation object sample channel 112 and the sheath fluid channels 114, 114 join together to form a main channel 115. The isolation object sample laminar flow S, which is delivered through the isolation object sample channel 112, and the sheath fluid laminar flows T, which are delivered through the sheath fluid channels 114, 114, join together in the main channel 115, thereby forming a sheath flow having the isolation object sample laminar flow sandwiched between the sheath fluid laminar flows (see the below-described FIG. 5C).

In addition, the sheath fluid introduced from the sheath fluid inlet 113 is also delivered to a sheath fluid bypass channel 118 formed separately from the sheath fluid channels 114. One end of the sheath fluid bypass channel 118 is connected to the sheath fluid inlet 113, while the other end is connected near the communication port of the below-described isolation channel 116 to the main channel 115 (see FIG. 4). The sheath fluid introduction end of the sheath fluid bypass channel 118 should be connected to one of the sheath fluid inlet 113 and sheath fluid passing parts including the sheath fluid channels 114, 114, but is preferably connected to the sheath fluid inlet 113. When the sheath fluid bypass channel 118 is connected to the center position about which the two sheath fluid channels 114 are geometrically symmetric (i.e., the sheath fluid inlet 113 in this embodiment), the sheath fluid can be equally distributed into the two sheath fluid channels 114. In FIG. 4, the reference numeral 156 shows the communication port of the isolation channel 116 to the main channel 115, and the reference numeral 181 shows the discharge port for the sheath fluid delivered through the sheath fluid bypass channel 118 into the isolation channel 116.

In FIG. 2, the reference numeral 115a shows a detection region to be irradiated with an excitation light, where the detection of fluorescence and scattered light emitted from an isolation object sample is performed. Isolation object samples are, while being arranged in a line in the sheath flow formed in the main channel 115, delivered to the detection region 115a and irradiated with the excitation light.

The main channel 115 is branched into three channels downstream the detection region 115a. FIGS. 5A to 5C show the configuration of the branch part of the main channel 115. Downstream the detection region 115a, the main channel 115 communicates with three branch channels, that is, the isolation channel 116 and waste paths 117, 117. Among them, the isolation channel 116 is a channel into which a target biological sample is drawn. Samples other than the target biological sample contained in the isolation object sample (hereinafter sometimes referred to as "non-target biological samples") are not drawn into the isolation channel 116, but flow into either of the two waste paths 117.

The sheath fluid bypass channel 118 is connected to a discharge port 181 provided near the communication port 156 of the isolation channel 116 to the main channel 115 (see FIG. 4). The sheath fluid introduced from the sheath fluid inlet 113 is introduced into the isolation channel 116 from the discharge port 181, and forms, at the communication port 156, a flow of the sheath fluid from the isolation channel 116 side toward the main channel 115 side (detailed description of this flow will be given below).

The isolation unit 12 is composed of three substrate layers. The isolation object sample channel 112, the sheath fluid channel 114, the main channel 115, the isolation channel 116, and the waste path 117 are formed of a first substrate layer $a_1$ and a second substrate layer $a_2$ (see FIG. 4). Meanwhile, the sheath fluid bypass channel 118 is formed of the second substrate layer $a_2$ and a third substrate layer $a_3$. The sheath fluid bypass channel 118 formed in the substrate layers $a_2$ and $a_3$ is not connected to the isolation object sample channel 112, the sheath fluid channel 114, or the main channel 115 formed in the substrate layers $a_1$ and $a_2$, and connects between the sheath fluid inlet 113 and the discharge port 181 of the isolation channel 116. FIG. 6 and FIG. 7 show the configuration of the sheath fluid inlet 113-side end and the discharge port 181-side end of the sheath fluid bypass channel 118, respectively.

Incidentally, the substrate layer structure of the isolation unit 12 is not limited to the three-layer structure. In addition, the configuration of the sheath fluid bypass channel 118 is not limited to the illustrated structure either, as long as it is capable of connecting between the sheath fluid inlet 113 and the discharge port 181 of the isolation channel 116 without intersecting the isolation object sample channel 112, the sheath fluid channel 114, and the main channel 115.

For drawing a target biological sample into the isolation channel 116, a negative pressure is generated in the isolation channel 116 by the first pressure regulation unit 31, and then the target biological sample is sucked into the isolation channel 116 utilizing the negative pressure. The first pressure regulation unit 31 is a piezoelectric element. The first pressure regulation unit 31 is located at the position corresponding to the isolation channel 116. More specifically, the first pressure regulation unit 31 is located at the position corresponding to a pressure chamber 161 that is provided as a region formed of an extended inner cavity in the isolation channel 116 (see FIG. 3 and FIG. 4). The pressure chamber 161 is provided downstream the communication port 156 and the discharge port 181 in the isolation channel 116.

The inner cavity of the pressure chamber 161 is extended in the plane direction (width direction of the isolation channel 116) as shown in FIG. 2 and also extended in the cross-sectional direction (height direction of the isolation channel 116) as shown in FIG. 4. That is, the isolation channel 116 is extended in the width direction and the height direction in the pressure chamber 161. In other words, the isolation channel 116 is formed such that its cross section perpendicular to the flow direction of the isolation object sample and the sheath fluid increases in the pressure chamber 161.

The first pressure regulation unit 31 generates an expansion/contraction force with a change in the applied voltage, and causes a pressure change in the isolation channel 116 through the surface of the isolation unit 12 (contact surface). When a flow occurs in the isolation channel 116 as a result of a pressure change in the isolation channel 116, the volume in the isolation channel 116 changes at the same time. The volume in the isolation channel 116 changes until the volume defined by the amount of displacement of the first pressure regulation unit 31 corresponding to the applied voltage is reached. More specifically, in the expanded state where a voltage is applied, the first pressure regulation unit 31 presses a displacement plate 311 (see FIG. 4) that forms the pressure chamber 161 to keep the volume of the pressure chamber 161 small. Then, with a decrease in the applied voltage, the first pressure regulation unit 31 generates a force in the contracting direction and weakens the pressing of the displacement plate 311, whereby a negative pressure is generated in the pressure chamber 161.

In order for the expansion/contraction force of the first pressure regulation unit 31 to be efficiently transmitted to the pressure chamber 161, as shown in FIG. 4, it is preferable that the surface of the isolation unit 12 is depressed at the position corresponding to the pressure chamber 161, and the first pressure regulation unit 31 is located in the depression. As a result, the displacement plate 311 to serve as the contact surface with the first pressure regulation unit 31 can be reduced in thickness, whereby the displacement plate 311 can be easily displaced with a change in the pressing force associated with the expansion/contraction of the first pressure regulation unit 31, causing a volume change in the pressure chamber 161.

In FIG. 4 and FIGS. 5A to 5C, the reference numeral 156 shows the communication port of the isolation channel 116 to the main channel 115. The target biological sample delivered in the sheath flow formed in the main channel 115 is drawn into the isolation channel 116 from the communication port 156. In order to facilitate the drawing of the target biological sample from the main channel 115 into the isolation channel 116, it is preferable that, as shown in FIG. 5C, the communication port 156 is opened at the position corresponding to the isolation object sample laminar flow S in the sheath flow formed in the main channel 115. The shape of the communication port 156 is not particularly limited. However, for example, the shape shown in FIG. 5A, where the opening is formed in the plane, or the shape shown in FIG. 5B, where the channel walls of the two waste paths 117 are notched to form the opening, may be employed.

The isolation unit 12 may be formed by attaching substrate layers together, which have formed therein the main channel 115 and the like. The formation of the main channel 115 and the like in the substrate layers may be performed by injection-molding a thermoplastic resin using a mold. As the thermoplastic resin, a plastic known as a material for microchips so far may be employed, such as polycarbonate, polymethyl methacrylate resin (PMMA), cyclic polyolefin, polyethylene, polystyrene, polypropylene, and polydimethyl siloxane (PDMS).

Next, the isolation operation of the isolation unit 12 will be described using FIGS. 8 to 11.

A target biological sample sucked by the first pressure regulation unit 31 into the isolation channel 116 is drawn into the pressure chamber 161 as shown in FIG. 8A. In the figure, the reference numeral P shows a target biological sample drawn into the pressure chamber 161, and the reference numeral 162 shows the drawing port for the target biological sample P into the pressure chamber 161. When the flow of the isolation object sample containing the target biological sample P and the sheath fluid flows into the pressure chamber 161 formed of an extended inner cavity, the flow turns into a jet stream and separates from the channel wall surface (see the arrow in FIG. 8A). Accordingly, the target biological sample P comes away from the drawing port 162 and is drawn deep into the pressure chamber 161.

In order to suck a target biological sample from the main channel 115 into the pressure chamber 161, it is preferable that the amount of volume increase in the pressure chamber 161 is greater than the volume of the isolation channel 116 from the communication port 156 to a drawing port 162 (see FIG. 4). In addition, it is preferable that the amount of volume increase in the pressure chamber 161 is such that a negative pressure sufficient to separate the flow of the isolation object sample containing the target biological sample P and the sheath fluid from the channel wall surface at the drawing port 162 is generated.

In this manner, when the target biological sample P is drawn deep into the pressure chamber 161 formed of an extended inner cavity of the isolation channel 116, even in the case where the pressure in the isolation channel 116 is reversed and turns into a positive pressure, the target biological sample P can be prevented from reflowing out from the pressure chamber 161 toward the main channel 115 side. That is, as shown in FIG. 8B, even in the case where there is a positive pressure in the isolation channel 116, because the isolation object sample and the sheath fluid flow out widely from near the drawing port 162, the moving distance of the target biological sample P itself, which has been drawn to a position far from the drawing port 162, is small. Accordingly, the target biological sample P does not reflow out and is maintained in the pressure chamber 161.

In the pressure chamber 161, it is preferable that the non-target biological samples or a sheath fluid containing the same is prevented from entering the isolation channel 116. However, as shown in FIG. 9, the flow of the isolation object sample and the sheath fluid (see the solid-line arrow in the figure) delivered through the main channel 115 has a large momentum, and thus may flow into the isolation channel 116 from the communication port 156. The flow of the isolation object sample and the sheath fluid that has flowed into the isolation channel 116 from the communication port 156 changes its direction in the isolation channel 116 and flows toward the main channel 115 side along the channel wall of the isolation channel 116 (see the dotted-line arrow in the figure).

The flow of the isolation object sample and the sheath fluid flowing out from the isolation channel 116 along the channel wall toward the main channel 115 side is restrained by the channel wall and thus is slow, causing the stagnation of the non-target biological samples or an isolation object sample and sheath fluid containing the same at the communication port 156. Such stagnation obstructs the operation for isolating a target biological sample and non-target biological samples from being performed at a high speed.

In contrast, in the sample isolation kit 1 according to an embodiment of the present technology, the sheath fluid introduced by the sheath fluid bypass channel 118 from the discharge port 181 into the isolation channel 116 functions to suppress the entry of non-target biological samples or an isolation object sample and sheath fluid containing the same into the isolation channel 116 during the non-isolation operation. That is, the sheath fluid introduced from the sheath fluid inlet 113 is introduced from the discharge port 181 into the isolation channel 116 and forms a sheath fluid flow from the isolation channel 116 side toward the main channel 115 side (hereinafter sometimes referred to as "reverse flow") at the communication port 156 (see FIG. 10A). Then, this reverse flow opposes the flow of the isolation object sample and the sheath fluid that is entering the isolation channel 116 from the main channel 115, whereby the entry of the isolation object sample and the sheath fluid into the isolation channel 116 is prevented.

It is preferable that the reverse flow has a momentum corresponding to the momentum (strength) of the flow of the isolation object sample and the sheath fluid that is entering the isolation channel 116 from the main channel 115. The momentum of the reverse flow can be controlled by regulating the amount of sheath fluid delivered to the sheath fluid bypass channel 118, and the amount of fluid delivery can be controlled by regulating the channel diameter of the sheath fluid bypass channel 118. In addition, the fluid delivery amount may also be regulated using a fluid delivery section such as a syringe pump, a valve provided in the sheath fluid bypass channel 118, or the like.

The flow rate ratio between the flow rate of the sheath fluid introduced from the sheath fluid inlet 113 into the sheath fluid channel 114 and that into the sheath fluid bypass channel 118 is determined by the channel resistance ratio between the two channels. Accordingly, even when the pressure of introducing the sheath fluid into the sheath fluid inlet 113 changes, the above flow rate ratio does not change, allowing for a stable operation. In addition, also in the case where the sheath fluid flow rate has to be changed in order to change the speed of the isolation object sample passing in the detection region 115a, there is no need to separately control the flow rate of the sheath fluid channel 114 and the flow rate of the sheath fluid bypass channel 118.

It is preferable that the momentum of the reverse flow is such that the entry of the isolation object sample and the sheath fluid from the main channel 115 into the isolation channel 116 can be completely suppressed. However, the reverse flow does not necessarily have to completely suppress the entry as long as the entry is reduced to some extent. As described above, when there is a flow of the isolation object sample and the sheath fluid flowing out from the isolation channel 116 along the channel wall toward the main channel 115 side, such a flow causes the stagnation of the non-target biological samples or an isolation object sample and sheath fluid containing the same at the communication port 156. As shown in FIG. 10B, when the entry of the isolation object sample and the sheath fluid from the main channel 115 into the isolation channel 116 can be reduced to some extent, the flow of the isolation object sample and the sheath fluid flowing out from the isolation channel 116 along the channel wall toward the main channel 115 side, which causes stagnation, can be suppressed.

Incidentally, by suppressing the stagnation of non-target biological samples or an isolation object sample and sheath fluid containing the same at the communication port 156, the adhesion of the target biological sample and non-target biological samples to the channel wall can also be prevented.

A reverse flow is formed at the communication port 156 also at the time of sucking the target biological sample into the isolation channel 116 (see FIG. 11A). Accordingly, during the isolation operation, it is necessary to suck the target biological sample into the isolation channel 116 with a suction pressure that overcomes the reverse flow (see FIG. 11B). The amount of volume increase in the pressure chamber 161 should be large enough to generate a suction pressure that overcomes the reverse flow.

Further, as shown in FIG. 11B, it is necessary that the target biological sample is sucked to a position beyond the discharge port 181 in the isolation channel 116. When the suction into the isolation channel 116 is insufficient, it may happen that the reverse flow formed by the sheath fluid introduced by the sheath fluid bypass channel 118 from the discharge port 181 into the isolation channel 116 causes the target biological sample to reflow out into the main channel 115.

In order to suck the target biological sample sufficiently to a position beyond the discharge port 181, the amount of volume increase in the pressure chamber 161 is set larger than the flow rate of the reverse flow, and the flow rate of the isolation object sample and the sheath fluid sucked by a negative pressure from the main channel 115 into the isolation channel 116 is set higher than the flow rate of the reverse flow.

After a desired amount of target biological sample can be introduced into the pressure chamber 161 by the isolation unit 12 formed in this manner, the target biological sample flows toward an isolation channel terminal 119 connected to the pressure chamber 161 and also to the storage unit 13 (see FIG. 2).

Incidentally, considering a pressure change in the pressure chamber 161 caused by the first the pressure regulation unit 31, it is preferable that the pressure chamber 161 and the isolation channel terminal 119 are connected through an opening/closing valve or the like.

Here, the isolation unit 12 shown in FIG. 2 is configured such that the sheath fluid inlet 113 is connected to the sheath fluid bypass channel 118. However, in the isolation unit according to an embodiment of the present technology, it is also possible that the sheath fluid bypass channel 118 is not connected to the sheath fluid inlet 113, and an introduction path 118A is separately provided as shown in FIG. 12. In this case, the sheath fluid is introduced from the sheath fluid inlet 113, while another solution different from the sheath fluid (e.g., culture solution, etc.) can be introduced from the introduction path 118A. Then, the solution introduced from the introduction path 118A passes through the isolation channel 116, the pressure chamber 161, and the isolation channel terminal 119.

Accordingly, although it may happen that the sheath fluid is incorporated on the downstream side of the pressure chamber 161, because the environment in the introduction path 118A is such that a larger amount of culture solution than the sheath fluid is present, an environment favorable for the target biological sample after isolation and recovery by the isolation unit 12 can be automatically created. Further, the below-described storage unit 13 has gas permeability. Thus, when the environment in the storage unit 13 is suited for culturing the target biological sample (e.g., $CO_2$ concentration: 5%, temperature: 37° C., humidity: 90 to 95%), even then the isolation step by the isolation unit 12 is performed for a long period of time, the quality loss of the target biological sample isolated and recovered can be avoided.

In addition, in the case of the configuration as shown in FIG. 12, the flow rate of the sheath fluid bypass channel 118 can be individually controlled. Therefore, in exchangeable microchip-type isolation units 12, even in the case where there are design differences among the isolation units 12 (e.g., in the case where there are great variations in the channel width and height, etc.), by controlling the flow rate of the sheath fluid bypass channel 118, the isolation conditions can be optimized considering the design differences among the isolation units 12.

(3) Storage Unit

The sample isolation kit 1 according to an embodiment of the present technology includes a storage unit 13 in which a target biological sample is housed.

This storage unit is formed in a bag-like shape in which a target biological sample is housed, for example, and includes an opening valve that is connected to the isolation channel terminal 119 of the isolation unit 12 through the hermetically sealing unit 14.

The opening valve employs the configuration of a so-called check valve, such that in the state where a target biological sample is housed in the storage unit 13 through the opening valve, the target biological sample does not come out from the storage unit 13.

In addition, because of the configuration of the opening valve, the target biological sample does not contact the external atmosphere.

The configuration of the storage unit 13 described above is merely an example, and a known configuration may be employed as long as the configuration does not allow for the contact between the target biological sample and the external atmosphere.

(4) Hermetically Sealing Unit

In the sample isolation kit 1 according to an embodiment of the present technology, a hermetically sealing unit 14 is provided between the housing unit 11 and the isolation unit 12 and also between the isolation unit 12 and the storage unit 13, and the units are hermetically connected to each other. Hereinafter, an example of the configuration of the hermetically sealing unit 14 will be described using FIG. 13.

The hermetically sealing unit 14 roughly includes a male member 141 connected to the opening valve of the housing unit 11 (or the channel of the isolation unit 12) and a female member 142 hermetically connected to the male member 141 through a sealing member 143.

The male member 141 has formed therein a through hole 141a, and the entire body is formed in an approximately cylindrical shape. Further, the male member 141 includes a projection 141b projecting along the axis of the through hole 141a and a connection tube 141c projecting in the direction perpendicular to the axis of the through hole 141a. The connection tube 141c also has a through hole formed therein, and the through hole communicates with the through hole 141a. That is, the inside of the male member 141 is formed in a hollow shape.

The male member 141 formed in this manner is configured such that, for example, the projection 141b is inserted into the opening valve of the housing unit 11 (or the channel of the isolation unit 12), and the through hole formed in the male member 141 communicates with the inside of the housing unit 11 (or the channel of the isolation unit 12).

Meanwhile, the female member 142 is formed in an approximately cylindrical shape having formed therein a through hole 142a. Then, one end of the female member 142 (in FIG. 13, the back-side end on the plane of paper) is inserted into the channel of the isolation unit 12 (or the opening valve of the storage unit 13), and the through hole 142a provided in the female member 142 communicates with the channel of the isolation unit 12 (or the inside of the storage unit 13).

In addition, the sealing member 143 is formed in a ring-like shape having a circular hole 143a formed therein, and the inner diameter of the circular hole 143a is the same as or slightly smaller than the inner diameter of the through hole 141a of the male member 141 and the inner diameter of the through hole 142a of the female member 142.

The female member 142 formed in this manner is connected to the male member 141 through the sealing member 143 and a connection member 144. The connection member 144 is formed in a ring-like shape having a through hole 144a, and the inner diameter of the through hole 144a is the same as or slightly larger than the outer diameter of the connection tube 141c of the male member 141 and the outer diameter of the female member 142.

When the male member 141 and the female member 142 are connected using this connection member 144, the sealing member 143 is interposed between the male member 141 and the female member 142, whereby the male member 141 and the female member 142 are hermetically connected. As a result, the units 11, 12, and 13 are hermetically connected through the hermetically sealing unit 14.

Meanwhile, although the male member 141 and the female member 142 are hermetically connected through the connection member 144, the connection member 144 is detachable by certain procedures. As a result, the male member 141 and the female member 142 are easily detachable from each other. That is, the housing unit 11, the isolation unit 12, and the storage unit 13 connected through the hermetically sealing unit 14 are easily detachable from each other.

Incidentally, the configuration shown in FIG. 13 is merely an example, and an ordinary hermetical structure (such as a known aseptic connector, etc.) used for sample isolation kits may be employed. Alternatively, it is also acceptable that a tubular member projects from each of the units 11, 12, and 13, and the tubular members projecting from the units 11, 12, and 13 are welded together to form a hermetical structure. In some embodiments, one or more projecting tubular members are located on the outside of a channel of the isolation unit. A basement layer may be configured to allow projecting tubular members to be located on the outside of the channel of the isolation unit.

(5) Labeling Unit

As necessary, the sample isolation kit 1 according to an embodiment of the present technology may also include a labeling unit 15 that labels the isolation object sample with a fluorescent dye.

Before the target biological sample is isolated from the isolation object sample in the isolation unit 12, the labeling unit 15 labels the isolation object sample flowing into the isolation unit 12 with a fluorescent dye. In addition, it is also preferable that the labeling unit 15 is detachably connected to the isolation unit 12 through the hermetically sealing unit 14.

Incidentally, although the labeling unit 15 is hermetically connected to the isolation unit 12 in FIG. 1, any configuration is possible as long as the isolation object sample can be labeled by the labeling unit 15. In some embodiments, the labeling unit 15 is hermetically connected to the housing unit 11 having housed therein the isolation object sample. In some embodiments, the fluorescent dye for labeling may be present in the isolation unit 12 or the housing unit 11.

The kind or number of fluorescent dyes, which with the labeling unit 15 labels the isolation object sample, is not particularly limited, and known dyes such as FITC (fluorescein isothiocyanate: $C_{21}H_{11}NO_5S$), PE (phycoerythrin), PerCP (peridinin chlorophyll protein), PE-Cy5, and PE-Cy7 can be suitably selected and used as necessary. Further, each isolation object sample may be modified with a plurality of fluorescent dyes.

Here, in the medical environment where the sample isolation kit 1 according to an embodiment of the present technology is used, the presence of any remaining fluorescent dye may be unacceptable. Accordingly, it is preferable that the fluorescent dye is eliminated as much as possible.

Therefore, in order to facilitate the elimination of a fluorescent dye from the target biological sample, it is preferable that the fluorescent dye is bound to the isolation object sample through a degradable linker A degradable linker is a connector molecule that is degraded upon specific external stimulation. Examples thereof include linkers that are degraded by light at a specific wavelength, linkers that are degraded by an enzyme, and linkers that are degraded by the temperature.

The degradable linker is not particularly limited. However, in terms of not causing damage or the like to the target biological sample, it is preferable to use a photodegradable linker.

A photodegradable linker is a molecule having a structure that is degraded at a specific wavelength.

Examples thereof include a methoxy nitrobenzyl group, a nitrobenzyl group (JP 2010-260831 A), a parahydroxyphenacyl group (Tetrahedron Letters, 1962, Vol. 1, p. 1), a 7-nitroindoline group (Journal of the American Chemical Society, 1976, Vol. 98, p. 843), a 2-(2-nitrophenyl)ethyl group (Tetrahedron, 1997, Vol. 53, p. 4247), and a (coumarin-4-yl)methyl group (Journal of the American Chemical Society, 1984, Vol. 106, p. 6860).

(6) Biological Sample Housing Unit

In the case where the isolation object sample is a peripheral blood mononuclear cell, the peripheral blood mononuclear cells can be obtained by separation from whole blood as a biological sample. When the whole blood separation step and the step of collecting peripheral blood mononuclear cells, which are isolation object samples, can be performed consistently in an enclosed space, the problem of the incorporation of other substances into the isolation object samples can be solved more reliably.

Accordingly, as necessary, the sample isolation kit 1 according to an embodiment of the present technology may include a biological sample housing unit 16 for housing a biological sample.

The configuration of the biological sample housing unit 16 is not particularly limited. For example, it is formed in a bag-like in which a biological sample is housed, and includes an opening valve that is connected with the housing unit 11 through the hermetically sealing unit 14. The opening valve employs the configuration of a so-called check valve, such that in the state where a biological sample is housed in the biological sample housing unit 16 through the opening valve, the biological sample does not contact the external atmosphere.

This configuration is merely an example, and a known configuration may be employed as the configuration of the biological sample housing unit 16. In the case where the biological sample is whole blood, the configuration of a so-called blood bag may be employed.

(7) Separation Unit

As necessary, the sample isolation kit 1 according to an embodiment of the present technology may include a separation unit 17 that separates an isolation object sample from the biological sample. The separation unit 17 is not indispensable in the sample isolation kit 1 according to an embodiment of the present technology, and it is also acceptable that the biological sample is separated using an external separation device, for example.

The configuration of the separation unit 17 is not particularly limited, and a known configuration may be employed. For example, it is possible that the configuration of a so-called spiral channel is employed, and the biological sample housed in the biological sample housing unit 16 flows into the spiral channel. As a result, the isolation object sample is separated from the biological sample.

Then, the separated isolation object sample flows into the housing unit 11. Here, it is preferable that the separation unit 17 is also hermetically connected to the housing unit 11 through the hermetically sealing unit 14.

Further, it is preferable that the biological sample housing unit 16 is also hermetically connected to the separation unit 17 through the hermetically sealing unit 14.

(8) Sheath Container

In the sample isolation kit 1 according to an embodiment of the present technology, as described above, the isolation unit 12 forms a sheath flow and performs the isolation of a target biological sample from the isolation object sample.

As necessary, the sample isolation kit 1 according to an embodiment of the present technology may also include a sheath container 18 that houses the sheath fluid for use in the isolation unit 12.

The sheath container 18 includes, for example, a tubular member into which the sheath fluid flows, and the tubular member communicates with the sheath fluid inlet 113 of the isolation unit 12. As a result, the sheath fluid flows into the channel of the isolation unit 12, whereby a sheath flow is formed.

It is preferable that the sheath container 18 is detachably connected to the isolation unit 12 as necessary, and it is more preferable that the sheath container 18 is hermetically connected to the isolation unit 12 through the hermetically sealing unit 14.

Incidentally, the configuration of the sheath container 18 is not particularly limited, and a known configuration may be employed. In addition, the configuration for discharging a sheath fluid from the sheath container 18 is not particularly limited either, and it is also acceptable to use a driving source such as an actuator, for example. Further, in the sample isolation kit 1 according to an embodiment of the present technology, the sheath container 18 is not indispensable, and a configuration that is integrally formed in the housing unit 11 is also possible, for example.

(9) Disposal Unit

In the sample isolation kit 1 according to an embodiment of the present technology, when a target biological sample is isolated from an isolation object sample in the isolation unit 12, it is necessary to eliminate the non-target biological samples. In addition, because a sheath flow is formed and the target biological sample is isolated in the isolation unit 12, it is necessary to eliminate the isolation object sample and sheath fluid containing non-target biological samples.

Accordingly, the sample isolation kit 1 according to an embodiment of the present technology may also include a disposal unit 19 for disposing biological samples and a sheath fluid other than the target biological sample (hereinafter sometimes referred to as "waste").

In addition, for example, in the case where the disposal unit 19 is filled with waste, it is necessary to eliminate the disposal unit 19 itself. Therefore, it is preferable that the disposal unit 19 is detachably connected to the isolation unit 12 through the hermetically sealing unit 14.

Further, in the case where the sample isolation kit 1 according to an embodiment of the present technology includes the biological sample housing unit 16, the biological sample in the biological sample housing unit 16 may contain samples other than the isolation object sample. In such a case, samples other than the isolation object sample may be separated by the separation unit 17. In order to dispose such samples other than the isolation object sample, it is preferable that the disposal unit 19 is detachably hermetically connected to the separation unit 17 through the hermetically sealing unit 14 (see FIG. 1).

Incidentally, with respect to a waste path provided in the disposal unit 19, through which samples other than the isolation object sample flow, in the case where the path is connected to the channel through which the isolation object sample and the target biological sample flow (hereinafter sometimes referred to as "regular channel"), it is preferable that a reclosable valve is provided between each waste path and the regular channel.

In the sample isolation kit 1 according to an embodiment of the present technology described above, the housing unit 11, the isolation unit 12, and the storage unit 13 are hermetically connected through the hermetically sealing unit 14. Accordingly, the isolation of a target biological sample and the storage of the target biological sample can be implemented in an enclosed space, whereby the degree of purification of the isolation of target biological samples can be improved. In addition, the contamination of a sample isolation kit itself with a mist containing a target biological sample and/or the incorporation of other substances into the isolated target biological sample can be prevented.

As a result, the sample isolation kit 1 according to an embodiment of the present technology can be used for clinical applications, such as immune cell therapy, where the purity of the target biological sample is necessary.

2. Sample Isolation Kit According to Second Embodiment

In the sample isolation kit 1 according to an embodiment of the present technology shown in FIG. 1 and so forth, the pressure regulation unit 31 forms a part of the isolation unit 12.

Meanwhile, in a sample isolation kit 101 according to a second embodiment shown in FIG. 14, a second pressure regulation unit 32 may regulate the pressure of the whole sample isolation kit 101. In some embodiments, a sample isolation kit may have a first pressure regulation unit 31 configured to regulate sorting of a sample by isolation unit 12 in addition to a separate second pressure regulation unit 32.

Hereinafter, the configuration different from the sample isolation kit 1 according to the first embodiment, that is, the configuration of the pressure regulation unit, will be mainly described. The configurations other than the pressure regulation unit, which are common to the sample isolation kit 1 according to the first embodiment, will be indicated with the same reference numerals, and the description thereof will be omitted.

(1) Pressure Regulation Unit

In the sample isolation kit 101 according to an embodiment of the present technology, the housing unit 11, the isolation unit 12, and the storage unit 13 are hermetically connected to each other. Therefore, when the inside of the storage unit 13 is filled with a target biological sample, and the pressure in the storage unit 13 increases accordingly, the pressure in the isolation unit 12 may also increase. As a result, the isolation of a target biological sample by the isolation unit 12 may be affected.

Accordingly, the sample isolation kit 101 according to an embodiment of the present technology includes the pressure regulation unit 32 for regulating the pressure in the storage unit 13. In the following description, for the convenience of description, the pressure regulation unit 32 is referred to as "second pressure regulation unit 32" so as to distinguish from the first the pressure regulation unit 31.

The configuration of the second pressure regulation unit 32 is not particularly limited, and a known configuration may be employed. For example, as in the case of the first pressure regulation unit 31, the configuration may be such that a negative pressure is generated in the storage unit 13. Specifically, a piezoelectric element, can be mentioned.

In addition, as described above, the housing unit 11, the isolation unit 12, and the storage unit 13 are hermetically connected to each other. Therefore, the pressure in the housing unit 11 may increase following a pressure increase in the storage unit 13 or the isolation unit 12. As a result, the isolation object sample may be inhibited from flowing into the isolation unit 12, for example.

While the flow rate of the isolation object sample flowing out from the housing unit 11 is fixed in a constant value, it is preferable that the second pressure regulation unit 32 is configured to regulate the pressure in the sheath container. In addition, it is preferable that the second pressure regulation unit 32 is configured to regulate the pressure in the housing unit 11 and/or the storage unit 13.

Incidentally, as in the case of the sample isolation kit 1 according to the first embodiment, the sample isolation kit 101 shown in FIG. 14 may be configured such that the isolation unit 12 includes the pressure regulation unit 31, or that two pressure regulation units are provided.

Also in the sample isolation kit 101 according to the second embodiment described above, the housing unit 11, the isolation unit 12, and the storage unit 13 are hermetically connected through the hermetically sealing unit 14. Accordingly, the isolation of a target biological sample and the storage of the target biological sample can be implemented in an enclosed space, whereby the degree of purification of the isolation of target biological samples can be improved. In addition, the contamination of a sample isolation kit itself with a mist containing a target biological sample and/or the incorporation of other substances into the isolated target biological sample can be prevented.

As a result, the sample isolation kit 101 according to an embodiment of the present technology can be used for clinical applications, where the purity of the target biological sample is necessary.

Further, because of the presence of the second pressure regulation unit 32, even when the pressure in the storage unit 13 increases, the pressure in the isolation unit 12 and the housing unit 11 can be regulated. Therefore, the flowing in/out of the isolation object sample and the isolation of a target biological sample can be suitably performed.

3. Sample Isolation Device According to First Embodiment

The present technology also provides a sample isolation device using the sample isolation kit 1. Hereinafter, a sample isolation device 201 according to an embodiment of the present technology will be described using FIG. 15.

As shown in FIG. 15, the sample isolation device 201 roughly includes a sample isolation kit 1, a light irradiation unit 21, a light detection unit 22, and an arithmetic processing unit 23, and, as necessary, may also include a position control unit 24, a degradation light irradiation unit 25, a drug loading control unit 26, a culture unit 27, and a pressure regulation unit 28. Each unit will be described hereinafter.

(1) Sample Isolation Kit

The sample isolation device 201 according to an embodiment of the present technology includes a sample isolation kit 1 that performs the isolation and storage of a target biological sample.

Incidentally, the configuration of this sample isolation kit 1 is the same as the configuration of the sample isolation kit 1 shown in FIG. 1, and thus the description thereof will be omitted.

(2) Light Irradiation Unit

The sample isolation device 201 according to an embodiment of the present technology includes a light irradiation unit 21 that irradiates the isolation object sample with light.

Specifically, the light irradiation unit 21 irradiates, with light (excitation light), the isolation object sample passing through the detection region 115a provided on the main channel 115 of the isolation unit 12.

The light irradiation unit 21 is configured to include, for example, a light source that emits an excitation light, an objective lens that concentrates the excitation light on the isolation object sample passing through the main channel 115, and the like. The light source is suitably selected according to the purpose of the analysis from laser diodes, SHG lasers, solid lasers, gas lasers, high-intensity LEDs, and the like. As necessary, the light irradiation unit 21 may also include an optical element other than the light source and the objective lens.

(3) Light Detection Unit

The sample isolation device 201 according to an embodiment of the present technology includes a light detection unit 22 that detects fluorescence and scattered light emitted from the isolation object sample irradiated with an excitation light.

Specifically, the light detection unit 22 detects fluorescence and scattered light emitted from the isolation object sample, and converts the same into an electrical signal. Then, the electrical signal is output to the arithmetic processing unit 23.

The configuration of the light detection unit 22 is not particularly limited, and a known configuration may be employed. Further, the method for conversion into an electrical signal is not particularly limited either.

(4) Arithmetic Processing Unit

The sample isolation device 201 according to an embodiment of the present technology includes an arithmetic processing unit 23 into which an electrical signal obtained by conversion in the light detection unit 22 is input.

On the basis of the input electrical signal, the arithmetic processing unit 23 judges the optical properties of the isolation object sample and the target biological sample contained in the isolation object sample.

The arithmetic processing unit 23 further includes a gating circuit for computing a threshold for isolating the target biological sample from the isolation object sample, a threshold for determining whether a greater number of target biological samples than necessary have been isolated, a threshold for screening the target biological sample on the basis of the fluorescence intensity of the fluorescent dye used for labeling by the labeling unit 15, and the like.

Because of the configuration of the gating circuit, in the case where a threshold for isolating the target biological sample from the isolation object sample is computed, the threshold is converted into an electrical signal for isolation, and the isolation signal is output to the first pressure regulation unit 31 provided in the isolation unit 12. Incidentally, the configuration of the arithmetic processing unit 23 is not particularly limited, and a known configuration may be employed. Further, the method for arithmetic processing performed by the gating circuit of the arithmetic processing unit 23 may also be a known method.

(5) Position Control Unit

As necessary, the sample isolation device 201 according to an embodiment of the present technology may also include a position control unit 24.

In the case where the isolation unit 12 is configured as above, the excitation light has to irradiate the detection region 115a of the isolation unit 12, and the position control unit 24 controls the relative positional relationship between the sample isolation kit 1 and the light irradiation unit 21.

The configuration of the position control unit 24 is not particularly limited, and a known configuration may be employed. For example, an actuator to serve as a driving source can be mentioned.

(6) Degradation Light Irradiation Unit

As necessary, the sample isolation device 201 according to an embodiment of the present technology may also include a degradation light irradiation unit 25.

In the case where the configuration is such that the sample isolation kit 1 includes the labeling unit 15, and the isolation object sample is labeled with a fluorescent dye through a photodegradable linker, depending on the usage environment, it is necessary to eliminate the fluorescent dye from the isolation object sample.

The degradation light irradiation unit 25 irradiates the photodegradable linker with a predetermined light. As a result, the fluorescent dye can be eliminated from the isolation object sample.

Here, the wavelength of the light to irradiate the degradable linker should be a wavelength corresponding to each photodegradable linker. For example, in the case of methoxy nitrobenzyl, the degradation efficiency is the highest at 346 nm. Taking this as 1, the degradation efficiency is 0.89 at 364 nm, 0.15 at 406 nm, and 0.007 at 487 nm. A wavelength of 300 nm or less may cause damage to the isolation object sample, and thus is preferably not used. In addition, in order not to damage the isolation object sample, particularly the target biological sample, it is preferable that irradiation is performed at 30 mW/cm$^2$, 100 sec→3 J/cm$^2$, for example. As the amount of irradiation, in the case where the target biological sample is a cell, although this depends on its kind, it is said that damage to DNA is caused at 500 J/cm$^2$, resulting in the inhibition of cell growth (Callegari, A. J. & Kelly, T. J. Shedding light on the DNA damage checkpoint, Cell Cycle 6, 660-6 (2007)). In addition, it is also reported that cytotoxicity does not occur at 42 J/cm$^2$ (Masato T, et al, Optical cell separation from three-dimensional environment in photodegradable hydrogels for pure culture techniques, Scientific Reports 4, Article number. 4793 (2014)).

(7) Drug Loading Control Unit

As necessary, the sample isolation device 201 according to an embodiment of the present technology may also include a drug loading control unit 26.

The target biological sample stored in the storage unit 13 of the sample isolation kit 1 has to be activated and subjected to gene introduction as necessary. The drug loading control unit 26 loads a drug for activating the target biological sample or a drug for introducing a gene into the target biological sample into the storage unit 13. Alternatively, the unit controls the loading amount of each drug according to the state of the stored target biological sample.

As the drug, known drugs are usable, such as various cytokines (interleukin-2 (IL-2), IL-7, IL-15, IL-21, etc.), various antibodies (anti-CD3 antibody, anti-CD28 antibody, etc.), and the like for activation, and various viral vectors into which a plasmid that expresses the target gene has been introduced (adeno-associated vector, adenovirus vector, retrovirus vector, lentivirus vector, etc.) for gene introduction. A suitable drug may be selected according to the kind and state of the target biological sample stored. Further, it is also possible to use several kinds of known drugs in combination.

(8) Culture Unit

As necessary, the sample isolation device 201 according to an embodiment of the present technology may also include a culture unit 27.

According to the intended use of the sample isolation device 201, it may be necessary to increase the number of target biological samples isolated by the sample isolation kit 1. That is, in the culture unit 27, the target biological sample stored in the storage unit 13 is cultured.

Specifically, the temperature in the storage unit 13 is controlled to increase the amount of the target biological sample housed in the storage unit 13.

Incidentally, the method for temperature control in the culture unit 27 is not particularly limited, and a known method may be employed. For example, it is possible that a heating element is provided in the storage unit 13, and an electrical signal to control the temperature rise/fall is output from the culture unit 27 to the heating element.

(9) Pressure Regulation Unit

As necessary, the sample isolation device 201 according to an embodiment of the present technology may also include the pressure regulation unit 28.

As described above, the housing unit 11, the isolation unit 12, and the storage unit 13 in the sample isolation kit 1 are hermetically connected to each other. Therefore, a pressure change in the storage unit 13 may cause a pressure change in the housing unit 11 and/or the isolation unit 12. The pressure regulation unit 28 regulates the pressure in the storage unit 13.

Specifically, a piezoelectric element, which is a configuration that generates a negative pressure in the storage unit 13, can be mentioned.

Further, it is preferable that the pressure regulation unit 28 is configured to regulate the flow rate of the isolation object sample flowing out from the housing unit 11, thereby regulating the pressure in the housing unit 11. In addition, it is preferable that the pressure regulation unit 28 is configured to regulate the flow rate of the sheath fluid flowing out from the sheath container 18, thereby regulating the pressure in the sheath container 18.

That is, the pressure regulation unit 28 employs the same configuration as the second pressure regulation unit 32 provided in the sample isolation kit 101 shown in FIG. 14.

(10) Other Configurations

In the sample isolation device 201 according to an embodiment of the present technology, the sample isolation kit 1 includes the separation unit 17 described above, and the isolation object sample is separated from the biological sample by such a sample isolation kit 1.

However, the configuration does not have to be such that the sample isolation kit 1 performs the separation, and it is also possible that the sample isolation device 201 according to an embodiment of the present technology includes a separation unit (not shown) that performs the separation.

That is, for example, the separation unit may be a known centrifugal separator, and configured to centrifuge the entire sample isolation kit 1 or the biological sample housing unit 16 provided in the sample isolation kit 1.

4. Description of Operation of Sample Isolation Device According to First Embodiment The operation of the sample isolation device 201 will be described using FIGS. 16 to 19.

(1) Separation Step

First, in the sample isolation device 201 according to an embodiment of the present technology, an isolation object sample is separated from the biological sample by the sample isolation kit 1 or by the separation unit provided separately from the sample isolation kit 1. The method for the separation step S1 is not particularly limited, and a centrifugal separation method may be used.

(2) Reagent Binding Step

After the isolation object sample is separated in the separation step S1, a fluorescent antibody reagent is flowed by the labeling unit 15 into the housing unit 11 having housed therein the isolation object sample, and the reagent is bound to the isolation object sample (reagent binding step S2).

Incidentally, the kind or number of fluorescent dyes is not particularly limited, and known dyes such as FITC (fluorescein isothiocyanate: $C_{21}H_{11}NO_5S$), PE (phycoerythrin), PerCP (peridinin chlorophyll protein), PE-Cy5, and PE-Cy7 can be suitably selected and used as necessary. Further, each isolation object sample may be modified with a plurality of fluorescent dyes.

In addition, as described above, it is preferable that the fluorescent dye is bound to the isolation object sample through a degradable linker, particularly a photodegradable linker (3) Isolation Step After the isolation object sample is labeled with a fluorescent dye in the reagent binding step S2, an isolation step S3 of isolating a target biological sample from the isolation object sample on the basis of the optical properties is performed.

The details of the isolation step S3 will be described using FIG. 17. Incidentally, the step shown in FIG. 17 is merely an example.

As shown in FIG. 17, the isolation step S3 in the sample isolation device 201 according to an embodiment of the present technology includes a valve switching first step S31, a preliminary measurement step S32, a main measurement step S33, a valve switching second step S34, a target biological sample acquisition step S35, and a valve closing step S37. Each step will be described hereinafter.

(3-1) Valve Switching First Step

In the sample isolation device 201 according to an embodiment of the present technology, in the case where the valve is provided between a regular channel provided in the isolation unit 12 and a waste path provided in the disposal unit 19, the valve is opened such that the entire isolation object sample containing the target biological sample in the isolation unit 12 flows into the disposal unit 19 (valve switching first step S31).

(3-2) Preliminary Measurement Step

The preliminary measurement step S32 will be described using FIG. 18.

As shown in FIG. 18, the preliminary measurement step S32 includes at least a fluorescence intensity information acquisition step S322, a machine learning step S323, and a threshold setting step S324.

That is, in the state where the valve is opened through the valve switching first step S31, the isolation object sample is introduced into the channel in the isolation unit 12 from the housing unit 11 (S321). Then, the fluorescence intensity information of the isolation object sample is acquired by the light detection unit 22 (fluorescence intensity information acquisition step S322). Further, on the basis of the fluorescence intensity information, the arithmetic processing unit 23 performs machine learning using the information of the origin of the isolation object sample or the information of prior cases (machine learning step S323).

Then, in the arithmetic processing unit 23, it is estimated into what kind of groups the isolation object sample is divided. Subsequently, with respect to the fluorescence intensity obtained through the fluorescence intensity information acquisition step S322, a threshold for isolating the target biological sample from the isolation object sample, a threshold for determining whether a greater number of target biological samples than necessary have been isolated, a threshold for screening the target biological sample on the basis of the fluorescence intensity of the fluorescent dye used for labeling by the labeling unit 15, and the like are set (threshold setting step S324).

Upon the completion of the threshold setting step S324 in this manner, the preliminary measurement step S32 is completed.

(3-3) Main Measurement Step

After the completion of the preliminary measurement step S32, the main measurement step S33 is performed.

In the main measurement step S33, as shown in FIG. 19, in the state where the valve is opened through the valve switching first step S31, the isolation object sample is introduced into the channel in the isolation unit 12 from the housing unit 11 (S331). Then, the parameters of the first pressure regulation unit 31 included in the isolation unit 12 (piezo-amplitude, the time until the object biological sample reaches the branch part from the detection region 115*a*: delay time, etc.) are adjusted (S332). Upon the completion of the adjustment of each parameter, the main measurement step S33 is completed.

(3-4) Valve Switching Second Step

After the parameters for the first pressure regulation unit 31 are properly set through the main measurement step S33, the valve is switched (valve switching second step S34). This valve switching second step S34 makes it possible for the target biological sample to flow into the storage unit 13.

(3-5) Target Biological Sample Acquisition Step

After the valve switching second step S34, the isolation object sample is introduced into the channel in the isolation unit 12 from the housing unit 11. Then, the target biological sample is isolated by the isolation unit 12, the light irradiation unit 21, the light detection unit 22, and the arithmetic processing unit 23 and stored in the storage unit 13 (target biological sample acquisition step S35).

At that time, on the basis of the thresholds computed by the arithmetic processing unit 23, it is determined whether the number of the target biological samples in the storage unit 13 has reached the necessary number.

In the determination step S36, in the case where the number of target biological samples is smaller than the necessary number (NO in S36), the target biological sample acquisition step S35 is performed again. This operation is repeated until the number of target biological samples reaches the necessary number.

Meanwhile, in the case where the number of target biological samples is greater than the necessary number (YES in S36), the process moves on to the next valve closing step S37.

(3-6) Valve Closing Step

In the case where the number of target biological samples reaches the necessary number, in order to prevent the incorporation of the isolation object sample from the isolation unit 12 into the storage unit 13, the valve is closed (valve closing step S37). Upon the completion of the valve closing step S37, the isolation step S3 is completed.

(4) Internal Processing Step

After the isolation step S3 is completed, the internal processing step S4 is performed. In the internal processing step S4, the drug loading control unit 26 loads a predetermined drug into the storage unit 13, for example, and the activation of the target biological sample, the gene introduction into the target biological sample, and the like are performed.

(5) Culture Step

Further, after the internal processing step S4 is performed, the culture step S5 is performed. Specifically, the temperature of the storage unit 13 is controlled by the culture unit 27, and the target biological sample is cultured.

(6) Concentration Step

After the culture step S5 is performed, the procedure of concentrating the target biological sample stored in the storage unit 13 and cultured is performed (concentration step S6). Incidentally, the method for concentrating a target biological sample is not particularly limited, and a known method may be employed.

(7) Preservation Step

After the concentration step S6 is performed, the step of preserving the concentrated target biological sample is performed (preservation step S7). Incidentally, the method for preserving a target biological sample is not particularly limited, and may be suitably selected according to the kind of the target biological sample, etc.

In the sample isolation devices 201 according to an embodiment of the present technology described above, the housing unit 11, the isolation unit 12, and the storage unit 13 are hermetically connected through the hermetically sealing unit 14. Accordingly, the isolation of a target biological sample and the storage of the target biological sample can be implemented in an enclosed space, whereby the degree of purification of the isolation of target biological samples can be improved. In addition, the contamination of a sample isolation kit itself with a mist containing a target biological sample and/or the incorporation of other substances into the isolated target biological sample can be prevented.

As a result, the sample isolation device 201 according to an embodiment of the present technology can be used for clinical applications, where the purity of the target biological sample is necessary.

Additionally, the present technology may also be configured as below.

(1)

A sample isolation kit including:

a housing configured to detachably couple to a sample fluid channel of a microchip and provide a sample to the microchip, wherein the housing and the microchip are coupled using a hermetic seal; and a storage housing configured to detachably couple to an isolation channel of the microchip and receive a target biological sample isolated from the sample by the microchip, wherein the storage housing and the microchip are coupled using a hermetic seal.

(2)

The sample isolation kit according to (1), further including:

a sheath container configured to couple to at least one sheath fluid channel of the microchip and provide sheath fluid to the microchip.

(3)

The sample isolation kit according to (2), further including:

a pressure regulation device coupled to the sheath container and configured to regulate the pressure of the sheath container.

(4)

The sample isolation kit according to (3), wherein the pressure regulation device is coupled to the housing and is configured to regulate the pressure of the housing.

(5)

The sample isolation kit according to (3), wherein the pressure regulation device is coupled to the storage housing and is further configured to generate a negative pressure at the storage housing.

(6)

The sample isolation kit according to (1), further including:

a labeling unit configured to label the sample with the at least one fluorescent dye.

(7)

The sample isolation kit according to (6), wherein the labeling unit is configured to label the sample with the at least one fluorescent dye before the sample flows into the microchip.

(8)

The sample isolation kit according to (6), wherein the labeling unit is configured to detachably couple to the microchip using a hermetic seal.

(9)

The sample isolation kit according to (6), wherein the labeling unit is hermetically coupled to the housing.

(10)

The sample isolation kit according to (6), wherein the at least one fluorescent dye is configured to bind to the sample through a degradable linker (11)

The sample isolation kit according to (10), wherein the degradable linker is a photodegradable linker (12)

A sample isolation system including:

a microchip having a sample fluid channel and an isolation channel, wherein the microchip is configured to isolate a target biological sample from a sample;

a housing configured to detachably couple to the sample fluid channel and provide the sample to the microchip, wherein the housing and the microchip are coupled using a hermetic seal; and a storage housing configured to detachably couple to the isolation channel and receive the target biological sample isolated from the sample by the microchip, wherein the storage housing and the microchip are coupled using a hermetic seal.

(13)

The sample isolation system according to 12, wherein the microchip further includes at least one sheath fluid channel, and the sample isolation system further comprises a sheath container configured to couple to the at least one sheath fluid channel and provide sheath fluid to the microchip.

(14)

The sample isolation system according to 13, further including:

a pressure regulation device coupled to the sheath container and configured to regulate the pressure of the sheath container.

(15)

The sample isolation system according to 14, wherein the pressure regulation device is coupled to the housing and is configured to regulate the pressure of the housing.

(16)

The sample isolation system according to (15), wherein the pressure regulation device is coupled to the storage housing and is further configured to generate a negative pressure at the storage housing.

(17)

The sample isolation system according to (12), further including:

a labeling unit configured to label the sample with the at least one fluorescent dye using a degradable linker (18)

The sample isolation system according to (17), wherein the degradable linker is a photodegradable linker (19)

The sample isolation system according to (12), further including:

a light source configured to emit excitation light and positioned to irradiate a region of a channel of the microchip;

a light detector configured to detect fluorescence emitted from the target biological sample; and circuitry configured to compute isolation information based on at least one signal from the light detector.

(20)

The sample isolation system according to (12), further including a temperature controller configured to regulate the temperature of the storage housing.

(21)

The sample isolation system according to 12, further including a drug loading control unit configured to control loading of a drug into the storage housing.

(1a)

A sample isolation kit including:

a housing unit having housed therein an isolation object sample;

an isolation unit that isolates a target biological sample from the isolation object sample; and a storage unit that houses the target biological sample, the housing unit, isolation unit, and storage unit being hermetically connected.

(2a)

The sample isolation kit according to (1a), wherein the isolation unit further includes:

a channel through which the isolation object sample passes; and a pressure regulation unit that regulates the pressure in the channel of the isolation unit and/or the pressure in the storage unit.

(3a)

The sample isolation kit according to (1a) or (2a), further including a labeling unit that labels the isolation object sample with a fluorescent dye, wherein the labeling unit is hermetically connected to at least one of the housing unit and the isolation unit.

(4a)

The sample isolation kit according to any of (1a) to (3a), wherein the fluorescent dye is bound to the isolation object sample through a degradable linker.

(5a)

The sample isolation kit according to any of (1a) to (4a), further including a biological sample housing unit that houses a biological sample containing the isolation object sample, and a separation unit that separates the isolation object sample from the biological sample, and wherein the biological sample housing unit is hermetically connected to the separation unit, and the separation unit is hermetically connected to the housing unit.

(6a)

A sample isolation device including:

a sample isolation kit including a housing unit having housed therein an isolation object sample, an isolation unit that isolates a target biological sample from the isolation object sample, and a storage unit that houses the target biological sample, the housing unit, isolation unit, and storage unit being hermetically connected;

a light irradiation unit that irradiates the isolation object sample with an excitation light;

a light detection unit that detects fluorescence emitted from the isolation object sample; and an arithmetic processing unit that computes isolation information on the basis of the results of detection from the light detection unit.

(7a)

The sample isolation device according to (6a), wherein the arithmetic processing unit includes a gating circuit that sets thresholds for optical properties on the basis of information of the optical properties of the isolation object sample.

(8a)

The sample isolation device according to (6a) or (7a), wherein the isolation unit includes:

a channel through which the isolation object sample passes; and a pressure regulation unit that regulates the pressure in the channel of the isolation unit and/or the pressure in the storage unit.

(9a)

The sample isolation device according to any of (6a) to (8a), wherein the isolation object sample has a fluorescent dye bound thereto through a degradable linker, and the sample isolation device further includes a degradation unit that degrades the degradable linker.

(10a)

The sample isolation device according to any of (6a) to (9a), wherein the sample isolation kit includes a biological sample housing unit that houses a biological sample containing the isolation object sample, and a separation unit that separates the isolation object sample from the biological sample, the biological sample housing unit is hermetically connected to the separation unit, and the separation unit is hermetically connected to the housing unit.

(11a)

The sample isolation device according to any of (6a) to (10a), further including a culture unit that regulates the temperature of the storage unit.

(12a)

The sample isolation device according to any of (6a) to (11a), further including a drug loading control unit that controls the loading of a drug into the storage unit.

REFERENCE SIGNS LIST 1, 101 Sample isolation kit
11 Housing unit
12 Isolation unit
13 Storage unit

The invention claimed is:

1. A sample isolation kit comprising:
a housing configured to be detachably coupled to a sample fluid channel of a microchip and to provide a sample to the microchip;
a first hermetic structure configured to be connected between the housing and the microchip;
a storage housing configured to be detachably coupled to an isolation channel of the microchip and to receive a target biological sample isolated from the sample by the microchip; and
a second hermetic structure configured to be connected between the storage housing and the microchip, wherein at least one of the first hermetic structure and the second hermetic structure comprises a first tubular member, a second tubular member and a coupling member that provides an in-line hermetic connection between the first tubular member and the second tubular member.

2. The sample isolation kit of claim 1, further comprising:
a sheath container configured to be coupled to at least one sheath fluid channel of the microchip and provide sheath fluid to the microchip.

3. The sample isolation kit of claim 2, further comprising:
a pressure regulation device coupled to the sheath container and configured to regulate the pressure of the sheath container.

4. The sample isolation kit of claim 3, wherein the pressure regulation device is coupled to the housing and is configured to regulate the pressure of the housing.

5. The sample isolation kit of claim 3, wherein the pressure regulation device is coupled to the storage housing and is further configured to generate a negative pressure at the storage housing.

6. The sample isolation kit of claim 1, further comprising:
a labeling unit configured to label the sample with at least one fluorescent dye.

7. The sample isolation kit of claim 6, wherein the labeling unit is configured to label the sample with the at least one fluorescent dye before the sample flows into the microchip.

8. The sample isolation kit of claim 6, wherein the labeling unit is configured to be detachably coupled to the microchip using a hermetic seal.

9. The sample isolation kit of claim 6, wherein the labeling unit is configured to be hermetically coupled to the housing.

10. The sample isolation kit of claim 1, wherein the sample is labeled with at least one fluorescent dye bound to the sample through a degradable linker.

11. The sample isolation kit of claim 10, wherein the degradable linker is a photodegradable linker.

12. A sample isolation system comprising:
a microchip having a sample fluid channel and an isolation channel, wherein the microchip is configured to isolate a target biological sample from a sample;
a housing detachably coupled to the sample fluid channel and configured to provide the sample to the microchip;
a first hermetic structure connected between the housing and the microchip;
a storage housing detachably coupled to the isolation channel and configured to receive the target biological sample isolated from the sample by the microchip; and
a second hermetic structure connected between the storage housing and the microchip, wherein at least one of the first hermetic structure and the second hermetic structure comprises a first tubular member, a second tubular member and a coupling member that provides an in-line hermetic connection between the first tubular member and the second tubular member.

13. The sample isolation system of claim 12, wherein the microchip further comprises at least one sheath fluid channel, and the sample isolation system further comprises a sheath container configured to be coupled to the at least one sheath fluid channel and provide sheath fluid to the microchip.

14. The sample isolation system of claim 13, further comprising:
a pressure regulation device coupled to the sheath container and configured to regulate the pressure of the sheath container.

15. The sample isolation system of claim 14, wherein the pressure regulation device is coupled to the housing and is configured to regulate the pressure of the housing.

16. The sample isolation system of claim 15, wherein the pressure regulation device is coupled to the storage housing and is further configured to generate a negative pressure at the storage housing.

17. The sample isolation system of claim 12, further comprising:
a labeling unit configured to label the sample with at least one fluorescent dye using a degradable linker.

18. The sample isolation system of claim 17, wherein the degradable linker is a photodegradable linker.

19. The sample isolation system of claim 12, further comprising:
a light source configured to emit excitation light and positioned to irradiate a region of a channel of the microchip;
a light detector configured to detect fluorescence emitted from the target biological sample; and
circuitry configured to compute isolation information based on at least one signal from the light detector.

20. The sample isolation system of claim 12, further comprising a temperature controller configured to regulate the temperature of the storage housing.

21. The sample isolation system of claim 12, further comprising a drug loading control unit configured to control loading of a drug into the storage housing.

* * * * *